United States Patent
Chung et al.

(10) Patent No.: US 12,505,772 B2
(45) Date of Patent: Dec. 23, 2025

(54) ELECTRONIC APPARATUS FOR PROVIDING EXECUTION SCREEN OF APPLICATION, AND OPERATION METHOD THEREOF

(71) Applicant: Samsung Electronics Co., Ltd., Suwon-si (KR)

(72) Inventors: Jinkyo Chung, Suwon-si (KR); Joonhwan Kim, Suwon-si (KR); Sangeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/916,012

(22) Filed: Oct. 15, 2024

(65) Prior Publication Data

US 2025/0037630 A1    Jan. 30, 2025

Related U.S. Application Data

(63) Continuation of application No. 17/946,529, filed on Sep. 16, 2022, now Pat. No. 12,148,336, which is a
(Continued)

(30) Foreign Application Priority Data

Mar. 19, 2020   (KR) .......................... 10-2020-0034105

(51) Int. Cl.
*G09G 3/00*     (2006.01)
*G06F 9/451*    (2018.01)
(Continued)

(52) U.S. Cl.
CPC ............. *G09G 3/035* (2020.08); *G06F 9/451* (2018.02); *G06F 3/0482* (2013.01);
(Continued)

(58) Field of Classification Search
CPC .................................................. G06F 3/04883
See application file for complete search history.

(56) References Cited

U.S. PATENT DOCUMENTS

2012/0299813 A1*  11/2012  Kang .................... G06F 3/0486
                                                    345/156
2015/0338888 A1   11/2015  Kim et al.
(Continued)

FOREIGN PATENT DOCUMENTS

KR    10-2006-0071915 A    6/2006
KR    10-2015-0060278 A    6/2015
(Continued)

OTHER PUBLICATIONS

Korean Office Action with English translation dated Mar. 28, 2025; Korean Appln No. 10-2020-0034105.

*Primary Examiner* — Nan-Ying Yang
(74) *Attorney, Agent, or Firm* — Jefferson IP Law, LLP

(57) ABSTRACT

An electronic apparatus is provided. The electronic apparatus includes at least one housing which may have a plurality of states, at least one display, and at least one processor. The at least one processor is set to display a first execution screen of at least one application on a first display area of the at least one display when the at least one housing is in a first state, wherein the first display area corresponds to the first state, identify the transition of the at least one housing from the first state to a second state, display a first screen, which includes at least one graphic object, on the second display area when a first condition is satisfied, wherein the first screen is displayed on the basis of the transition of the at least one housing from the first state to the second state, and display a second execution screen of a first application on at least a portion of the second display region in response to a
(Continued)

first input to a first graphic object, corresponding to the first application, among the one or more graphic objects.

7 Claims, 26 Drawing Sheets

Related U.S. Application Data continuation of application No. PCT/KR2021/003111, filed on Mar. 12, 2021.

(51) Int. Cl.
  *G06F 3/0482* (2013.01)
  *G06F 3/0485* (2022.01)
  *G06F 3/0488* (2022.01)

(52) U.S. Cl.
  CPC .......... *G06F 3/0485* (2013.01); *G06F 3/0488* (2013.01); *G09G 2340/0442* (2013.01); *G09G 2340/0464* (2013.01); *G09G 2354/00* (2013.01)

(56) References Cited

U.S. PATENT DOCUMENTS

| | | | |
|---|---|---|---|
| 2015/0346991 A1 | 12/2015 | Kwak et al. | |
| 2016/0026381 A1 | 1/2016 | Kim et al. | |
| 2016/0085319 A1* | 3/2016 | Kim | H04M 1/0268 345/156 |
| 2016/0132074 A1* | 5/2016 | Kim | G06F 1/1652 345/173 |
| 2017/0075640 A1 | 3/2017 | Chun et al. | |
| 2017/0154609 A1 | 6/2017 | Yoon et al. | |

FOREIGN PATENT DOCUMENTS

| | | |
|---|---|---|
| KR | 10-2016-0012779 A | 2/2016 |
| KR | 10-2016-0055646 A | 5/2016 |
| KR | 10-2017-0062327 A | 6/2017 |
| KR | 10-2020-0014878 A | 2/2020 |

* cited by examiner

ELECTRONIC APPARATUS FOR PROVIDING EXECUTION SCREEN OF APPLICATION, AND OPERATION METHOD THEREOF

CROSS-REFERENCE TO RELATED APPLICATION(S)

This application is a continuation application of prior application Ser. No. 17/946,529, filed on Sep. 16, 2022, which is a continuation application, claiming priority under § 365 (c), of an International application No. PCT/KR2021/003111, filed on Mar. 12, 2021, which is based on and claims the benefit of a Korean patent application number 10-2020-0034105, filed on Mar. 19, 2020, in the Korean Intellectual Property Office, the disclosure of which is incorporated by reference herein in its entirety.

BACKGROUND

1. Field

The disclosure relates to an electronic device for providing an execution screen of an application and a method for operating the same.

2. Description of Related Art

Portable digital communication devices have become a must-have item for everyone in the modern era. Customers desire to receive various high-quality services anytime, anywhere using their portable digital communication devices.

To provide various high-quality services, portable digital communication devices store various types of applications. Portable digital communication devices execute the applications to provide a specific service and display graphic elements that may interact with a user displayed on an execution screen of an executed application.

Portable digital communication devices may be subjected to various states (e.g., folding or sliding) according to a user's control while displaying the execution screen of an application. In a case where a state of at least one housing of an electronic device is changed according to the user's control, such as folding or sliding, areas on a display having different sizes and aspect ratios are mainly used by the user. In particular, due to a change in the state of at least one housing of the electronic device, an area on the display that is smaller in size than before the change is mainly used by the user.

The above information is presented as background information only to assist with an understanding of the disclosure. No determination has been made, and no assertion is made, as to whether any of the above might be applicable as prior art with regard to the disclosure.

SUMMARY

In a case where different areas on a display are used by a change in a state of at least one housing of an electronic device, the change in the state of the at least one housing may be conjectured as made with or without the intent to terminate use of an application which used to be used by a user before the state change. To display a screen matching the user's intent when the state of at least one housing of the electronic device is changed, the user may set, through settings per application in a settings menu, whether to continue to display an execution screen of the application displayed on a pre-change on-display area, in the on-display area corresponding to the post-change state, when the state of at least one housing is changed.

However, the user may not be aware that it is possible to set, through settings per application in a settings menu, whether to continue to display the execution screen of the application displayed on the pre-change on-display area, in the on-display area corresponding to the post-change state, when the state of at least one housing is changed, and may thus fail to set a screen matching an intent of the user.

Further, the user may not be aware of an electronic device use pattern and may fail to make settings per application to match the use pattern.

Further, it may be burdensome for the user to find, from a settings application, a settings menu for setting whether to continue to display the execution screen of the application displayed on the pre-change on-display area, in the on-display area corresponding to the post-change state, when the state of at least one housing is changed.

Aspects of the disclosure are to address at least the above-mentioned problems and/or disadvantages and to provide at least the advantages described below. Accordingly, an aspect of the disclosure is to provide an electronic device for providing an execution screen of an application may display a screen to prompt whether to continue to display the execution screen of the application displayed on a pre-change on-display area, in the on-display area corresponding to the post-change state, in a case where a preset condition is met when the state of at least one housing is changed.

Additional aspects will be set forth in part in the description which follows and, in part, will be apparent from the description, or may be learned by practice of the presented embodiments.

In accordance with an aspect of the disclosure, an electronic device is provided. The electronic device includes at least one housing capable of having a plurality of states, at least one display, and at least one processor. The at least one processor may be configured to, when the at least one housing is in a first state, display a first execution screen of at least one application on a first display area corresponding to the first state of the at least one display, the first execution screen corresponding to the first display area, identify a transition of the at least one housing from the first state to a second state, the second state corresponding to a second display area of the at least one display, when a first condition is met, display a first screen including at least one graphic object in the second display area based on the transition of the at least one housing from the first state to the second state, the at least one graphic object respectively corresponding to the at least one application, and display a second execution screen of a first application in at least a portion of the second display area in response to a first input to a first graphic object corresponding to the first application among the at least one graphic object, the second execution screen corresponding to the second display area.

In accordance with another aspect of the disclosure, a method performed by an electronic device is provided. The method includes at least one housing capable of having a plurality of states and at least one display may comprise, when the at least one housing is in a first state, displaying a first execution screen of at least one application on a first display area of the at least one display corresponding to the first state, the first execution screen corresponding to the first display area, identifying a transition of the at least one housing from the first state to a second state, the second state corresponding to a second display area of the at least one display, when a first condition is met, displaying a first screen including at least one graphic object in the second display area based on the transition of the at least one housing from the first state to the second state, the at least one graphic object respectively corresponding to the at least one application, and displaying a second execution screen of a first application in at least a portion of the second display area in response to a first input to a first graphic object corresponding to the first application among the at least one graphic object, the second execution screen corresponding to the second display area.

In accordance with another aspect of the disclosure, an electronic device is provided. The electronic device includes at least one housing capable of having a plurality of states, at least one display, and at least one processor. The at least one processor may be configured to, when the at least one housing is in a first state, display a first execution screen of a first application on a first area of a first display area of the at least one display corresponding to the first state and display a second execution screen of a second application on a second area different from the first area of the first display area, identify a transition of the at least one housing from the first state to a second state, the second state corresponding to a second display area of the at least one display, and the first application supporting an execution screen corresponding to the second display area, and the second application not supporting an execution screen corresponding to the second display area, display a first graphic object corresponding to the first application in the second display area based on the transition of the at least one housing from the first state to the second state, display a third execution screen of the first application corresponding to the second display area in at least a portion of the second display area, based on an input to the first graphic object, and display a fourth execution screen of the first application on the first area of the first display area and a fifth execution screen of the second application on the second area of the first display area based on a transition of the at least one housing from the second state to the first state while the third execution screen and the graphic object are displayed in the second display area.

According to various embodiments, an electronic device for providing an execution screen of an application and a method for operating the same are provided. The electronic device display includes a screen to prompt whether to continue to display the execution screen of the application displayed on the pre-change on-display area, in the on-display area corresponding to the post-change state, in a case where a preset condition is met when the state of at least one housing is changed. Accordingly, the user may receive a screen matching an intent of the user by responding to the prompt screen.

Further, according to various embodiments, the electronic device display a screen for setting, per application, whether to continue to display the execution screen of the application displayed on the pre-change on-display area, in the on-display area corresponding to the post-change state, when the state of at least one housing is changed in a case where a preset condition is met, or may display a screen to prompt whether to desire to set so. Accordingly, the user may be reminded that application settings are possible based on the use pattern that the user does not recognize and, without the hassle to find, from the settings application, the settings menu for setting per application, set, per application, whether to continue to display the execution screen of the application displayed on the pre-change on-display area, in the on-display area corresponding to the post-change state, when the state of at least one housing is changed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
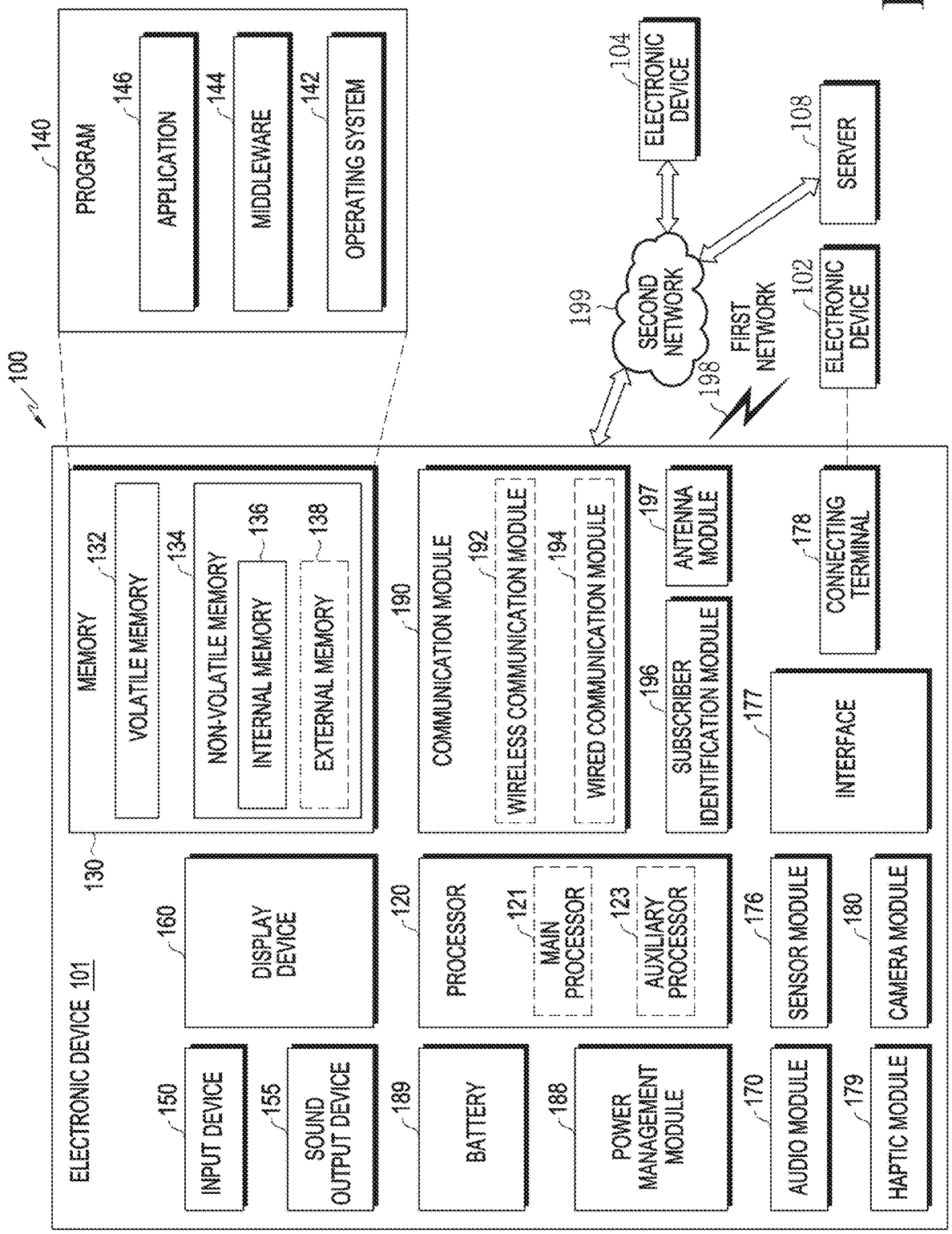
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In other embodiments, some of the components may be implemented as single integrated circuitry. For example, the sensor module 176 (e.g., a fingerprint sensor, an iris sensor, an illuminance sensor, and the like) may be implemented as embedded in the display device 160 (e.g., a display).

The processor 120 may be configured to execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to another embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that may be operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by the at least one component (e.g., the processor 120 or the sensor module 176) of the electronic device 101. The various data may include, for example, software (e.g., the program 140 or machine-readable instructions for the program 140) and input data or output data for a command related thereto. The memory 130 may include the volatile memory 132 or the non-volatile memory 134.

The program 140 may be stored in the memory 130 as software or machine-readable instructions, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, a digital pen (e.g., a stylus pen), and the like.

The sound output device 155 may output sound signals to the outside of the electronic device 101. The sound output device 155 may include, but is not limited to, a speaker or a receiver. In an embodiment, the speaker may be used for general purposes, such as playing multimedia or playing record, and the receiver may be used for an incoming calls. According to another embodiment, the receiver may be implemented as separate from, or as part of the speaker.

The display device 160 may be configured to visually provide information to the outside (e.g., a user) of the electronic device 101. In an embodiment, the display device 160 may include, for example, a display, a hologram device, or a projector and control circuitry to control a corresponding one of the display, hologram device, and projector. According to another embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to another embodiment, the sensor module 176 may include, but not limited to, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus that may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. In an embodiment, the power management module 188 may be implemented as at least part of, for example, a power management integrated circuit (PMIC).

The battery 189 may supply power to at least one component of the electronic device 101. According to another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include at least one communication processor that may be operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). In an embodiment, a corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may, for example, transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to another embodiment, the antenna module 197 may include a plurality of antennas. At least one antenna appropriate for a communication scheme used in a communication network, such as the first network 198 or the second network 199, may be selected from the plurality of antennas by, e.g., the communication module 190. In an embodiment, the signal or the power may then be transmitted or received between the communication module 190 and the external electronic device via the selected at least one antenna. According to still another embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to another embodiment, all or some of operations to be executed at the electronic device 101 may be executed at one or more of the external electronic devices 102, 104, or 108 (i.e., the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may, for example, perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
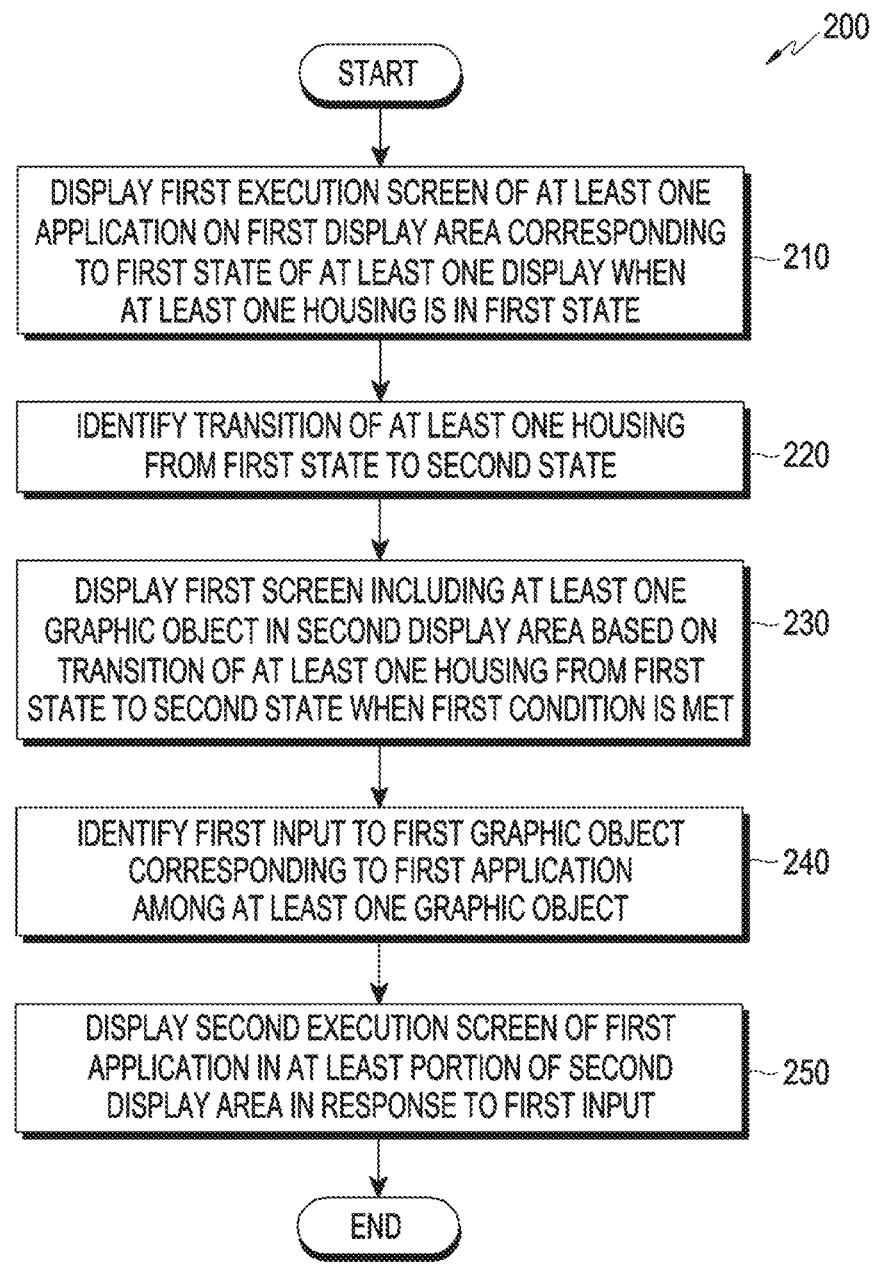
FIG. 2 is a flowchart illustrating operations of an electronic device according to an embodiment of the disclosure.

FIG. 2 is a flowchart 200 illustrating operations of an electronic device according to an embodiment of the disclosure.

In operation 210, at least one processor (e.g., a processor 120) of an electronic device (e.g., an electronic device 101) may display a first execution screen of at least one application on a first display area corresponding to a first state of at least one display (e.g., a display 160) when at least one housing of the electronic device 101 is in the first state.

Figure 3A:
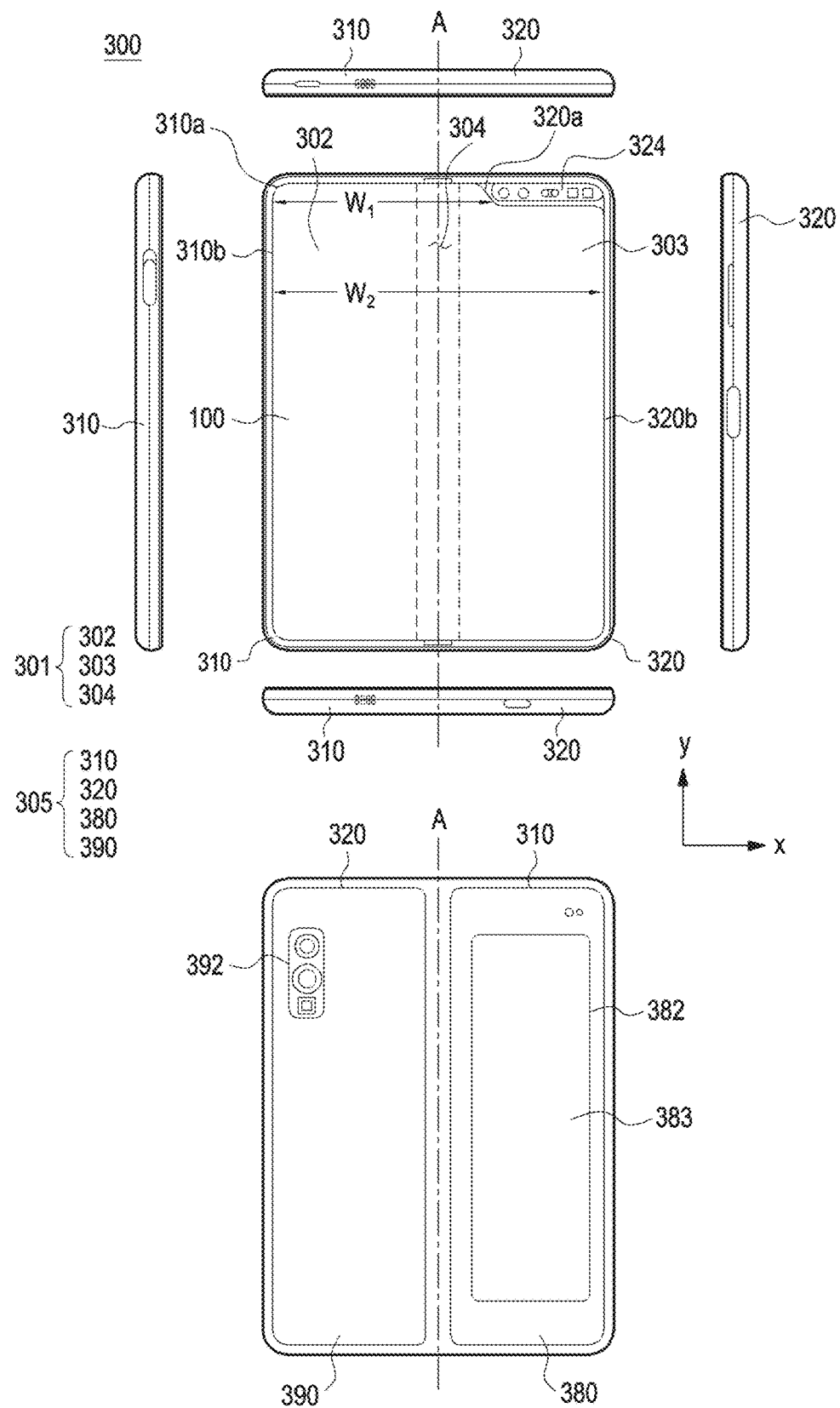
FIG. 3A is a view illustrating an unfolded state of an electronic device according to an embodiment of the disclosure.
Figure 3B:
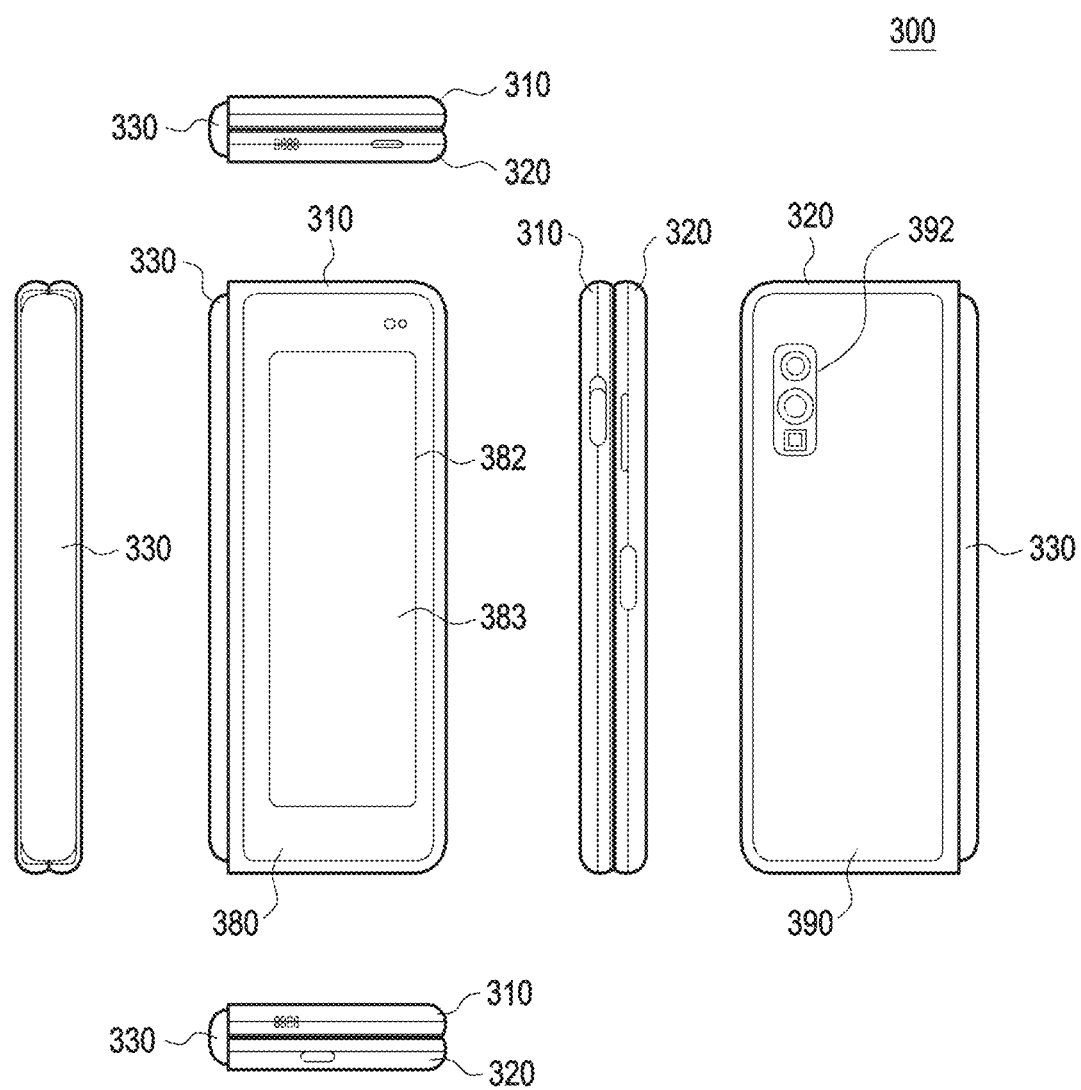
FIG. 3B is a view illustrating a folded state of an electronic device according to an embodiment of the disclosure.

According to an embodiment, the electronic device 101 may include at least one housing, and a plurality of states may be defined depending on folded or unfolded shape of at least one housing. The electronic device 101 may have an external shape shown in FIGS. 3A and 3B. As described below in connection with FIGS. 3A and 3B, the electronic device of FIGS. 3A and 3B may include a foldable housing 305 including a first housing structure 310 and a second housing structure 320. In the example of FIGS. 3A and 3B, a state illustrated in FIG. 3A may be defined as a first state, and a state shown in FIG. 3B may be defined as a second state.

Figure 4:
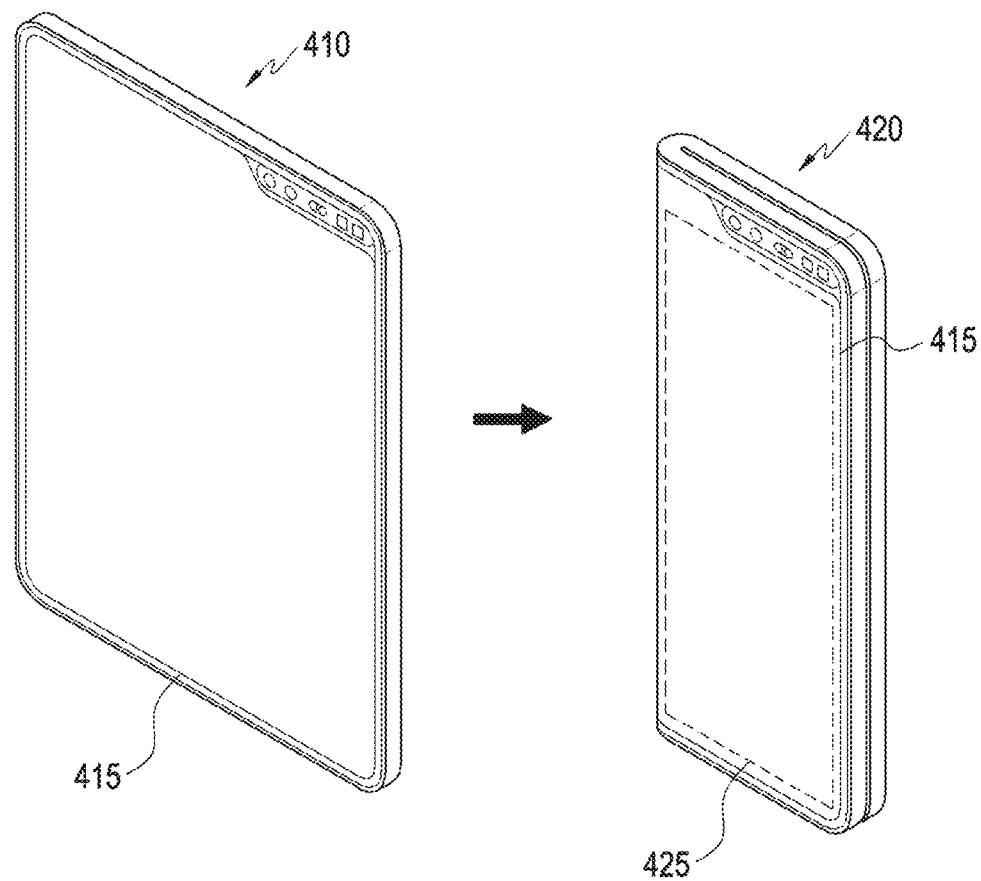
FIG. 4 illustrates at least one housing of an electronic device according to an embodiment of the disclosure.

According to another embodiment, the electronic device 101 may be the electronic device shown in FIG. 4.

FIG. 4 illustrates a first state 410 and a second state 420 of an example electronic device, according to an embodiment of the disclosure.

Figure 5:
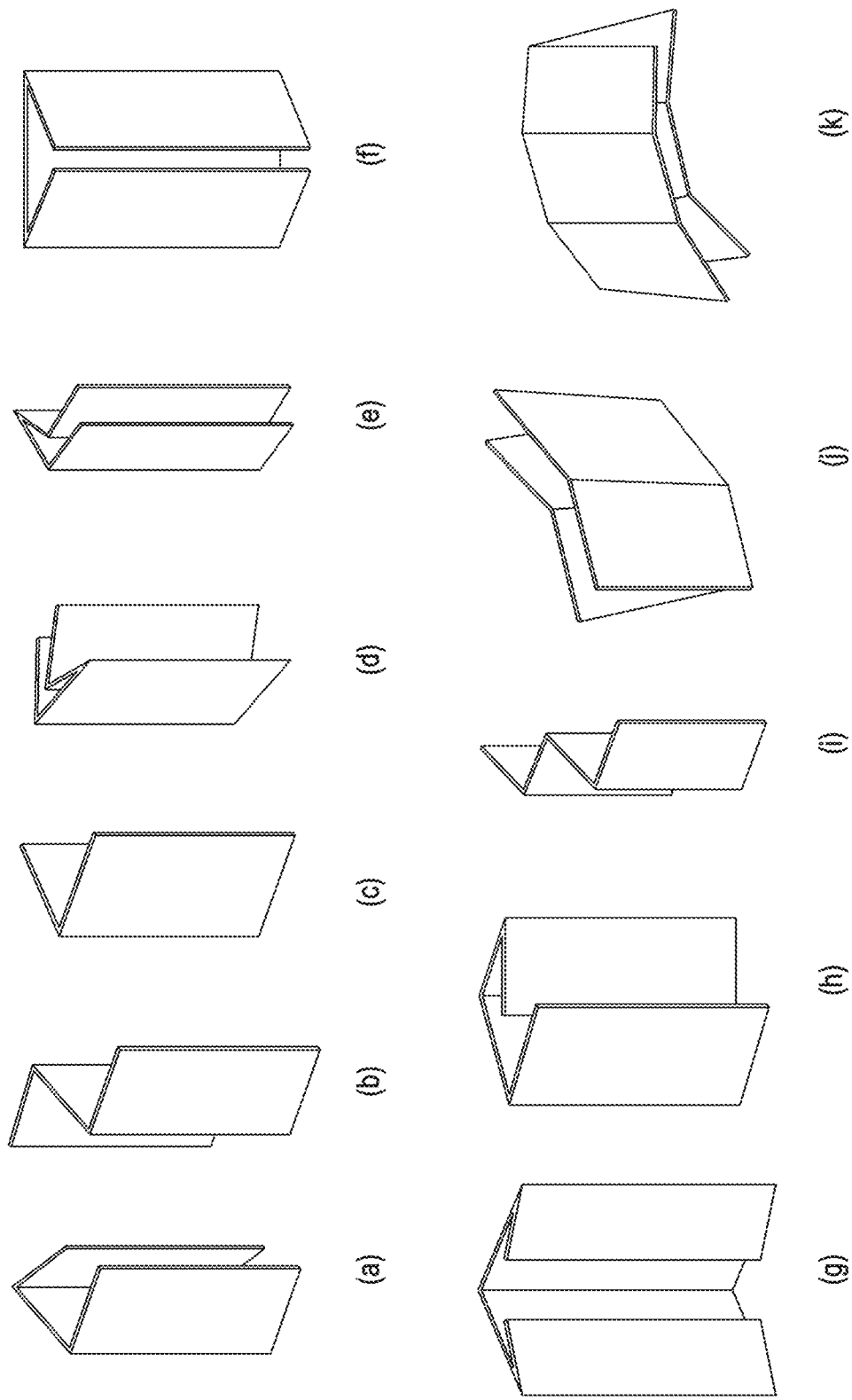
FIG. 5 illustrates at least one housing of an electronic device according to an embodiment of the disclosure.

According to an embodiment, the electronic device 101 may have various structures shown in FIG. 5.

FIG. 5 is a view illustrating various examples of an electronic device including at least two or more housing structures and a flexible display according to an embodiment of the disclosure.

In an embodiment, an electronic device may include two or more housing structures rotatably connected with each other and a flexible display.

In another embodiment, the flexible display may be disposed on the two or more housing structures and may be bent according to a rotational state of the housing structures. The rotational state of the housing structures is described below in more detail.

In still another embodiment, the electronic device may be formed in various forms according to the two or more housing structures, the flexible display provided in the electronic device, and the rotational state of the housing structures. As illustrated in FIG. 5, the various forms include a form (half fold) in which two areas are formed in the electronic device (e.g., a flexible display), a form (e.g., tri fold, z fold, or single open gate fold) in which three areas are formed in the electronic device (e.g., a flexible display), a form (e.g., double parallel reverse fold, double parallel fold, double gate fold, roll fold, accordion fold, half fold then half fold, and the like) in which four areas are formed in the electronic device (e.g., a flexible display), and a fold (e.g., half fold then tri fold) in which more areas are formed in the electronic device (e.g., flexible display). The electronic device may include housing structures rotatably connected with each other and a flexible display. The housing structures may be rotated into a corresponding form.

Figure 6:
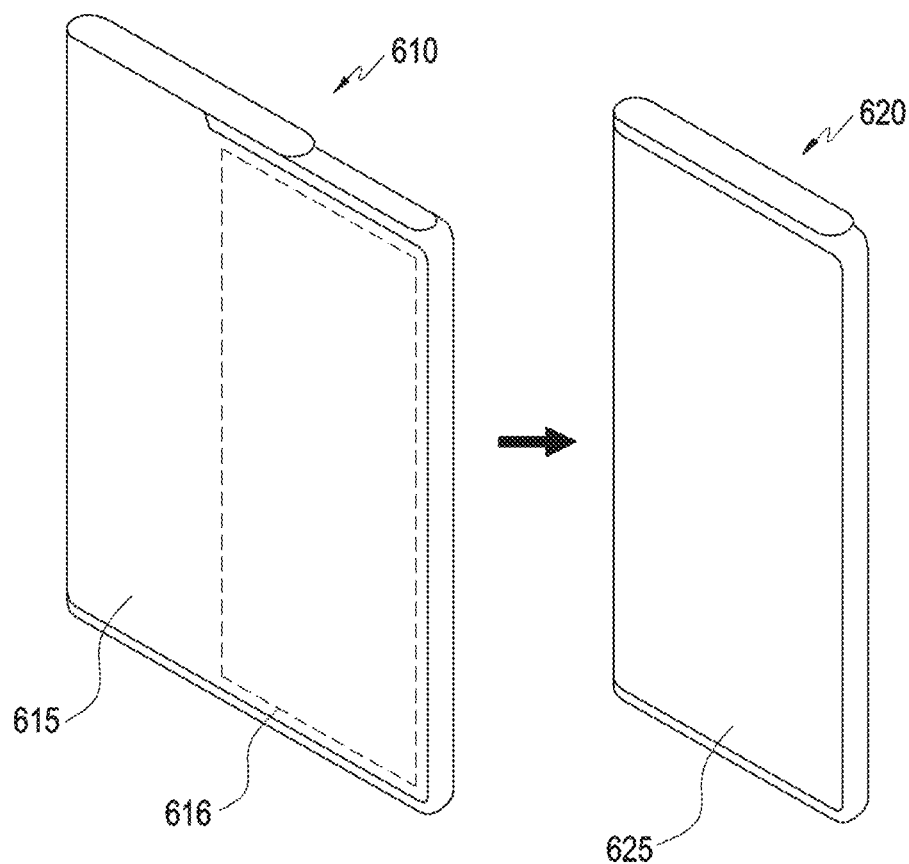
FIG. 6 illustrates at least one housing of an electronic device according to an embodiment of the disclosure.

According to various embodiments, the electronic device 101 may have the structure shown in FIG. 6.

FIG. 6 illustrates a first state 610 and a second state 620 of an example electronic device, according to an embodiment of the disclosure.

Referring to FIGS. 3A and 3B, the electronic device and the operation method thereof according to various embodiments are described focusing primarily on an electronic device including two housings and a flexible display. It will be appreciated by one of ordinary skill in the art that the electronic device and operation thereof are not limited to the examples shown in FIGS. 3A and 3B. The electronic device and operation method thereof according to the various embodiments may also be applied to electronic devices including three or more housings and a flexible display. Further, the electronic device and operation method thereof according to other embodiments, described below, may also be applied to electronic devices including at least two or more housings and at least two or more displays disposed on the housings, respectively.

In an embodiment, a first display area corresponding to a first state may mean an area on at least one display 160 primarily used when at least one housing of the electronic device 101 is in the first state. In the first state of the electronic device, for example, shown in FIG. 3A, the first display area may mean the entire area of the display 301. For example, in the first state 410 of the electronic device of FIG. 4, the first display area may mean the entire area of the display 415. For example, in the first state 610 of the electronic device of FIG. 6, the first display area may mean the entire area of the display 615.

In another embodiment, a first execution screen of at least one application may correspond to a first display area. The size of the first execution screen of at least one application may correspond to the size of the first display area.

Figure 7A:
FIG. 7A illustrates illustrating a screen displayed on an electronic device according to an embodiment of the disclosure.

An example of the first execution screen of at least one application is shown in FIG. 7A.

FIG. 7A illustrates illustrating a screen displayed on an electronic device according to an embodiment of the disclosure.

Referring to FIG. 7A, the first execution screen of one application is displayed on the first display area 710a. Other examples of the first execution screen of at least one application are shown in FIG. 8A.

Figure 8A:
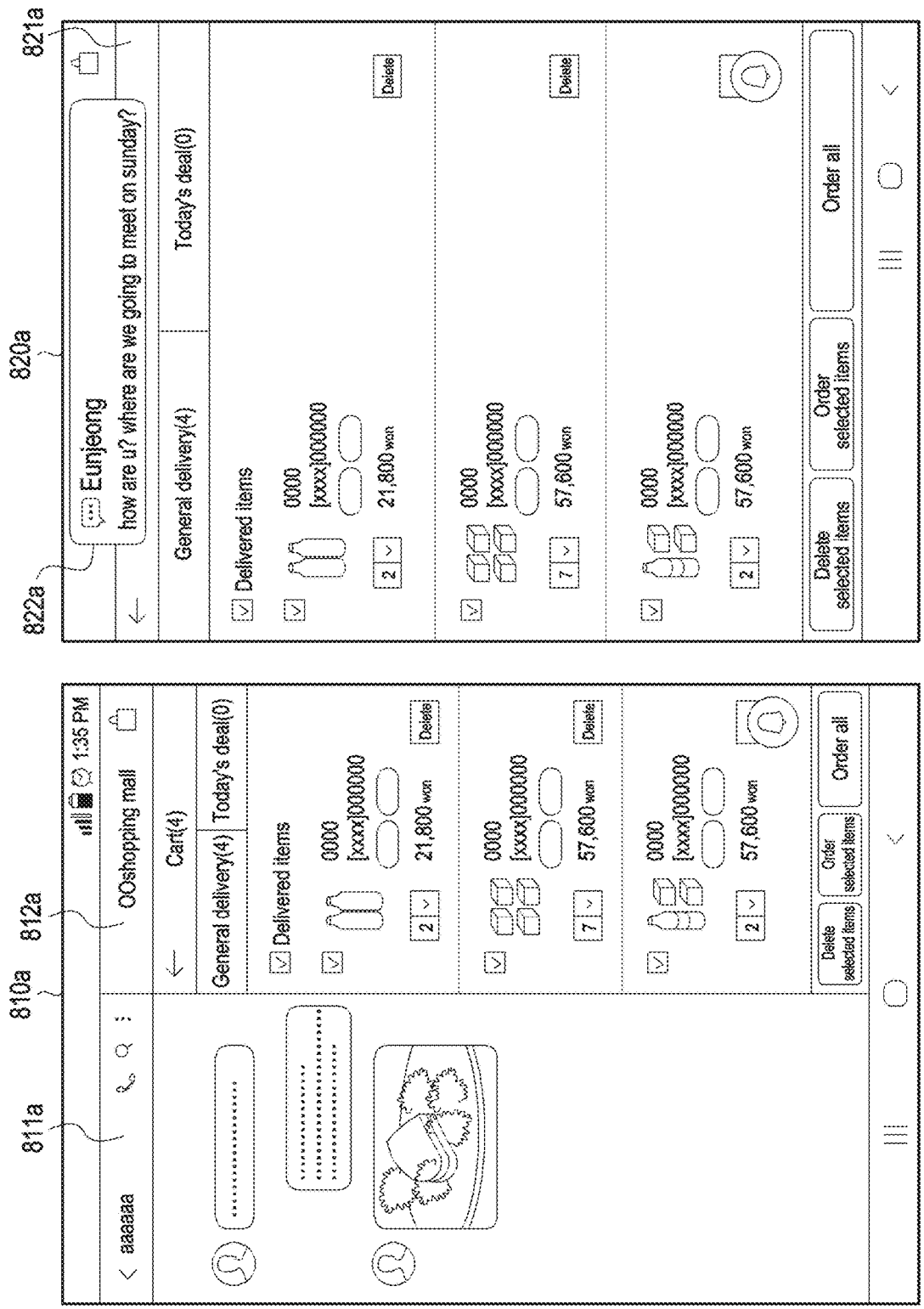
FIG. 8A illustrates screens displayed on an electronic device according to an embodiment of the disclosure.

FIG. 8A illustrates screens displayed on an electronic device according to an embodiment of the disclosure.

Referring to FIG. 8A, a first execution screen including an execution screen 811a of a first application and an execution screen 812a of a second application are displayed on the first display area 810a. Further, referring to FIG. 8A, the execution screen of the application may include a popup associated with the application. In the example of the first display area 820a, the first execution screen including the execution screen 821a of the first application and the execution screen 822a of the second application is displayed on the first display area 820a, and the execution screen 822a of the second application may be a popup associated with the second application. It will be appreciated by one of ordinary skill in the art that at least one application may be three or more applications.

In operation 220, at least one processor 120 of the electronic device 101 may identify that at least one housing transitions from the first state to the second state. In an embodiment, the second state may correspond to the second display area, and the second display area may mean an area on at least one display 160 primarily used when at least one housing of the electronic device 101 is in the second state. In the second state of the electronic device, for example, illustrated in FIG. 3B, the second display area may mean the entire area of the sub display 383. For example, in the second state 420 of the electronic device of FIG. 4, the second display area may mean a partial area 425 positioned on the front surface of the entire area of the display 415. For example, in the second state 620 of the electronic device of FIG. 6, the second display area may mean a partial area 625 of the display 615. In the example of FIG. 6, the second display area may correspond to a partial area 616 indicated by a dashed line of the first display area 615 in the first state.

In operation 230, when the first condition is met, the at least one processor 120 of the electronic device 101 may display a first screen including at least one graphic object in the second display area based on the transition of the at least one housing from the first state to the second state. In another embodiment, at least one graphic object may correspond to at least one application, respectively.

In still another embodiment, the at least one graphic object may include at least one of at least one image, icon, popup, or selectable menu respectively corresponding to the execution screen of at least one application.

Figure 7B:
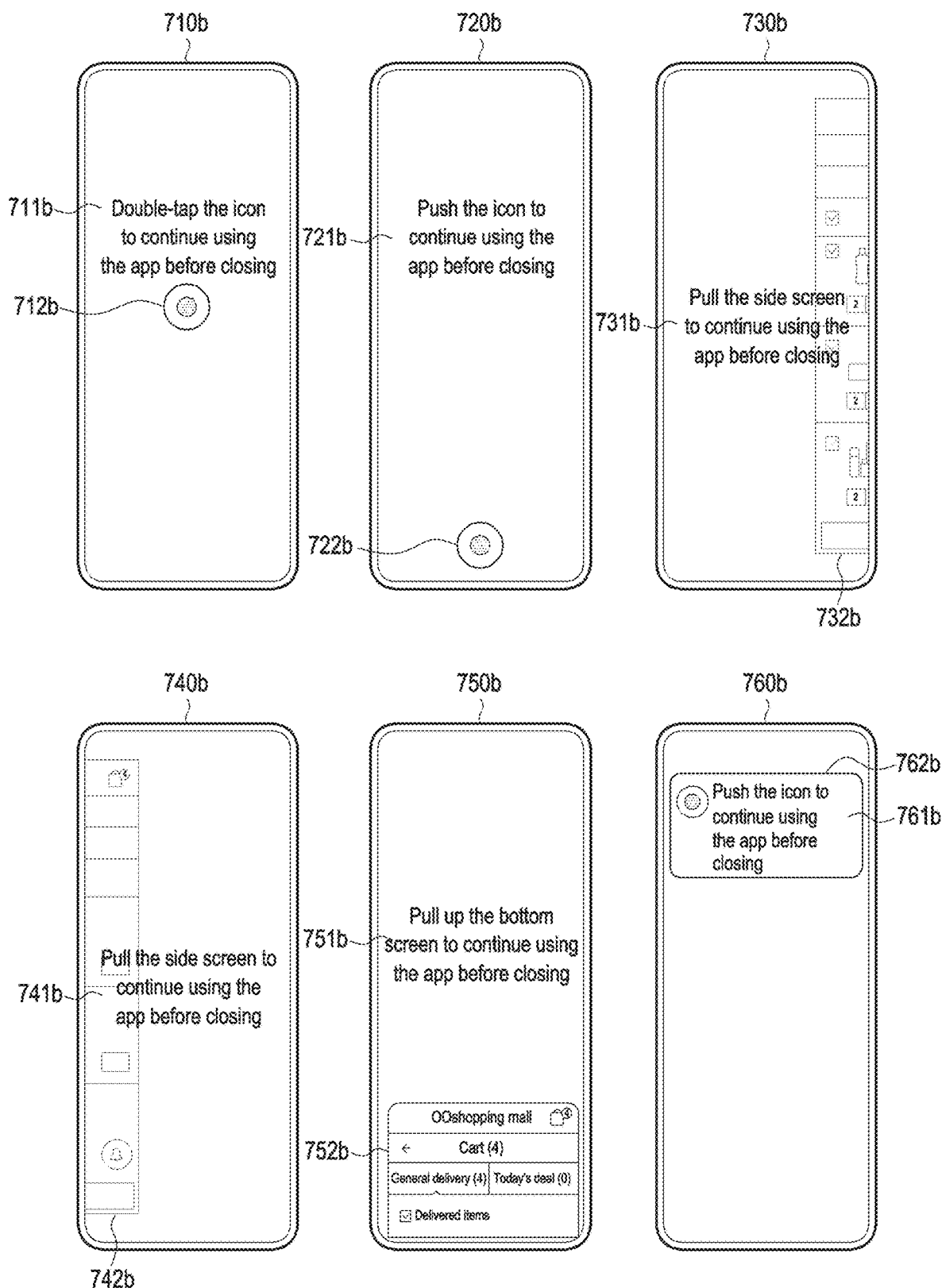
FIG. 7B illustrates screens displayed on an electronic device according to an embodiment of the disclosure.

FIG. 7B illustrates examples of the first screen corresponding to the case in which the first execution screen includes the execution screen of one application according to an embodiment of the disclosure.

Referring to FIG. 7B, according to various embodiments, a graphic object on a first screen 710b is an icon 712b corresponding to an application, and the icon 712b may be positioned in a center of the first screen 710b. In an embodiment, the first screen 710b may further include text 711b guiding an input scheme corresponding to the icon 712b. In another embodiment, the graphic object on the first screen 720b is an icon 722b corresponding to an application, and the icon 722b may be positioned at the bottom of the first screen 720b. The first screen 720b may further include text 721b for guiding an input scheme corresponding to the icon 722b. In still another embodiment, the graphic object on the first screen 730b is an image 732b corresponding to the execution screen of the application, and the image 732b may be positioned on the right side of the first screen 730b. The first screen 730b may further include text 731b for guiding an input scheme corresponding to the image 732b. In an embodiment, the graphic object on the first screen 740b is an image 742b corresponding to the execution screen of the application, and the image 742b may be positioned on the left side of the first screen 740b. The first screen 740b may further include text 741b guiding an input scheme corresponding to the image 742b. In another embodiment, the graphic object on the first screen 750b is an image 752b corresponding to the execution screen of the application, and the image 752b may be positioned at the bottom of the first screen 750b. The first screen 750b may further include text 751b guiding an input scheme corresponding to the image 752b. In still another embodiment, the graphic object on the first screen 760b may be a popup 762b corresponding to an application, and the popup 762b may be positioned at the top of the first screen 760b. The first screen 760b may further include text 761b guiding an input scheme corresponding to the popup 762b.

Figure 8B:
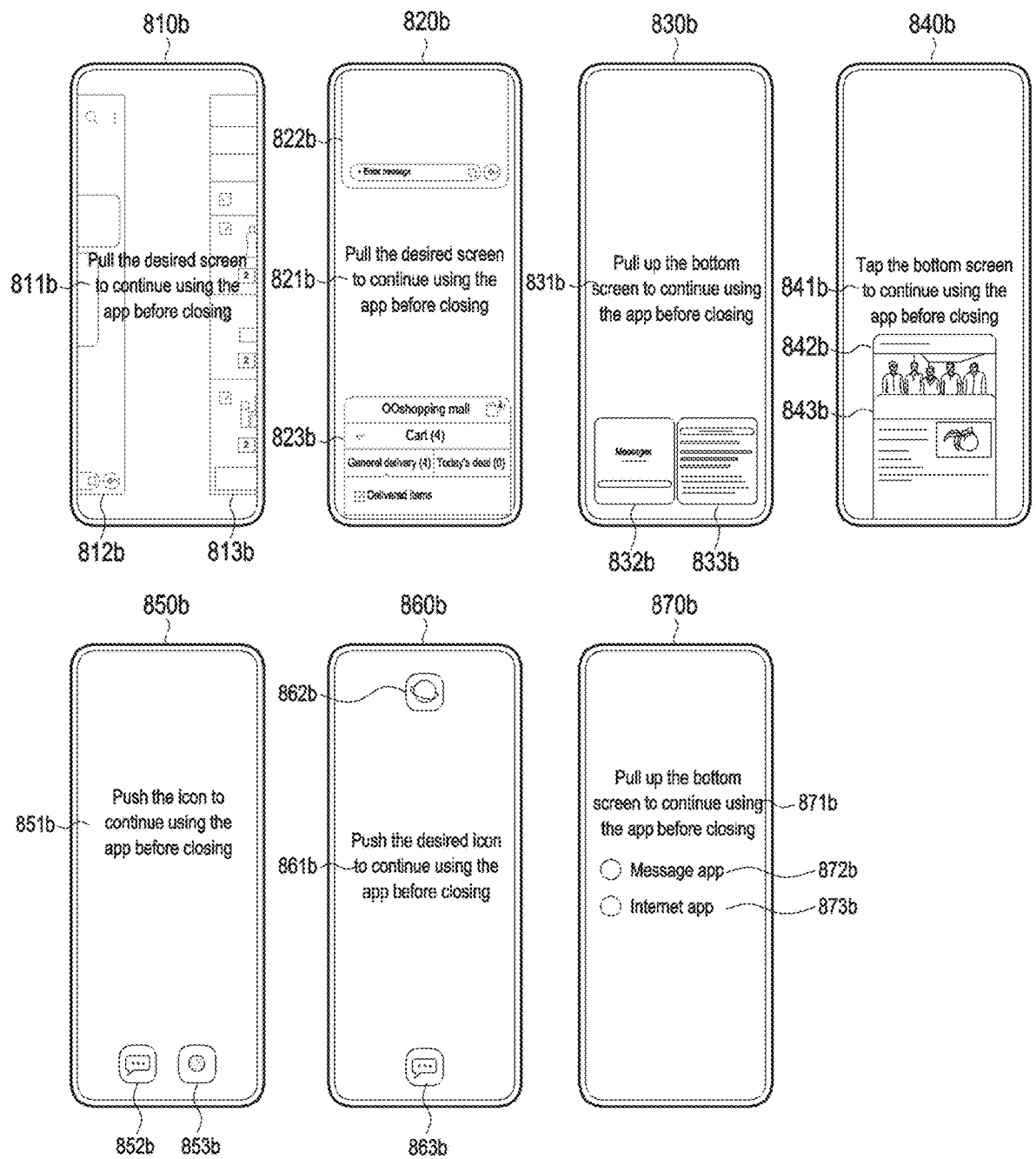
FIG. 8B illustrates screens displayed on an electronic device according to an embodiment of the disclosure.

FIG. 8B illustrates examples of the first screen corresponding to the case in which the first screen includes the execution screens of two applications according to an embodiment of the disclosure.

Referring to FIG. 8B, according to various embodiments, a graphic objects included in a first screen 810b are an image 812b corresponding to an execution screen of a first application and an image 813b corresponding to an execution screen of a second application. The image 812b corresponding to the execution screen of the first application may be positioned on the left side of the first screen 810b, and the image 813b corresponding to the execution screen of the second application may be positioned on the right side of the first screen 810b. The first screen 810b may, for example, further include text 811b for guiding an input scheme corresponding to the images 812b and 813b.

In an embodiment, the graphic objects included in the first screen 820b are an image 822b corresponding to the execution screen of the first application and an image 823b corresponding to the execution screen of the second application. The image 822b corresponding to the execution screen may be positioned at the top of the first screen 820b, and the image 823b corresponding to the execution screen of the second application may be positioned at the bottom of the first screen 820b. The first screen 820b may, for example, further include text 821b for guiding an input scheme corresponding to the images 822b and 823b.

In another embodiment, the graphic objects included in the first screen 830b are an image 832b corresponding to the execution screen of the first application and an image 833b corresponding to the execution screen of the second application. The image 832b corresponding to the execution screen of the first application may be positioned at the bottom left of the first screen 830b, and the image 833b corresponding to the execution screen of the second application may be positioned at the bottom right of the first screen 830b. The first screen 830b may further include text 831b for guiding an input scheme corresponding to the images 832b and 833b.

In still another embodiment, the graphic objects included in the first screen 840b are an image 842b corresponding to the execution screen of the first application and an image 843b corresponding to the execution screen of the second application. The image 843b corresponding to the execution screen of the second application may be positioned at the bottom of the first screen 840b, and the image 842b corresponding to the execution screen of the first application may be positioned at the top of the image 843b. The first screen 840b may, for example, further include text 841b for guiding an input scheme corresponding to the images 842b and 843b.

In an embodiment, the graphic objects included in the first screen 850b are an icon 852b corresponding to the first application and an icon 853b corresponding to the second application, and the icon 852b may be positioned at the bottom left of the first screen 850b, and the icon 853b may be positioned at the bottom right of the first screen 850b. The first screen 850b may further include text 851b for guiding an input scheme corresponding to the icons 852b and 853b.

In another embodiment, the graphic objects included in the first screen 860b are an icon 862b corresponding to the first application and an icon 863b corresponding to the second application, and the icon 862b may be positioned at the top of the first screen 860b, and the icon 863b may be positioned at the bottom of the first screen 860b. The first screen 860b may further include text 861b for guiding an input scheme corresponding to the icons 862b and 863b.

In still another embodiment, the graphic objects included in the first screen 870b may be a selectable menu item 872b corresponding to the first application and a selectable menu item 873b corresponding to the second application. The first screen 870b may further include text 871b for guiding an input scheme corresponding to the selectable menu items 872b and 873b.

In an embodiment, at least one processor 120 of the electronic device 101 may identify whether a first condition is met based on any combination of various criteria to be described below. In another embodiment, the first condition may be defined by combining at least some of the various criteria to be described below, under an or condition or an and condition.

In an embodiment, the first condition may include when at least one of at least one application is an application set in the settings menu of the electronic device 101 to allow the electronic device 101 to display the execution screen in the second display area when at least one housing transitions from the first state to the second state.

In another embodiment, the at least one processor 120 of the electronic device 101 may identify whether the first condition is met based on the number of times in which a wake-up input is performed on the electronic device (e.g., the electronic device 101) within a preset first time after at least one housing transitions from the first state to the second state. In still another embodiment, the wake-up input may include various inputs for waking up the electronic device 101 in a sleep state. The wake-up input may include an action of pressing a power key button, a double-tap action on the always-on display (AOD), an action of lifting to wake up the electronic device 101, or an action of touching the fingerprint sensor with a finger.

In an embodiment, the at least one processor 120 of the electronic device 101 may identify whether the first condition is met based on the number of times in which an input included in a predefined first input group is performed on the electronic device within a preset second time after at least one housing transitions from the first state to the second state. In another embodiment, the first input group may include at least some of the above-described examples of the wake-up input. In still another embodiment, the first input group may include at least some of various inputs for unlocking. The input for unlocking may include at least one of a pattern input for unlocking, a password input, or a push-and-drag input for unlocking.

In an embodiment, the at least one processor 120 of the electronic device 101 may identify whether the first condition is met based on whether at least one of the at least one application is included in a first application group. The first application group may be determined based on the number of times in which each of the plurality of applications provided by the electronic device is used in the second display area when the electronic device is in the second state. In another embodiment, the applications included in the first application group may be identified based on data stored in the memory (e.g., the memory 130) of the electronic device 101 in which the operations of FIG. 2 are performed. In still another embodiment, the at least one processor 120 of the electronic device 101 may identify the applications included in the first application group by communicating with a server (e.g., the server 108) storing data about the electronic device 101 and a plurality of external electronic devices, through the communication module (e.g., the communication module 190).

In an embodiment, the at least one processor 120 of the electronic device 101 may identify whether the first condition is met based on whether at least one of the at least one application is included in a second application group. The second application group may be determined based on the number of external electronic devices set in the settings menu to display the execution screen in the second display area when at least one transitions from the first state to the second state, among the plurality of external electronic devices.

In another embodiment, the at least one processor 120 of the electronic device 101 may identify whether the first condition is met based on the use time of at least one of at least one application while the at least one housing is in the first state.

In still another embodiment, the at least one processor 120 of the electronic device 101 may identify whether the first condition is met based on whether the time when the at least one housing transitions from the first state to the second state is included in a preset first time period, and at least one of the at least one application is included in a third application group. The third application group may, for example, be determined based on the frequency of using, on the electronic device, each application among the plurality of applications provided by the electronic device during the first time period. An example embodiment of the first screen is shown in FIG. 9.

Figure 9:
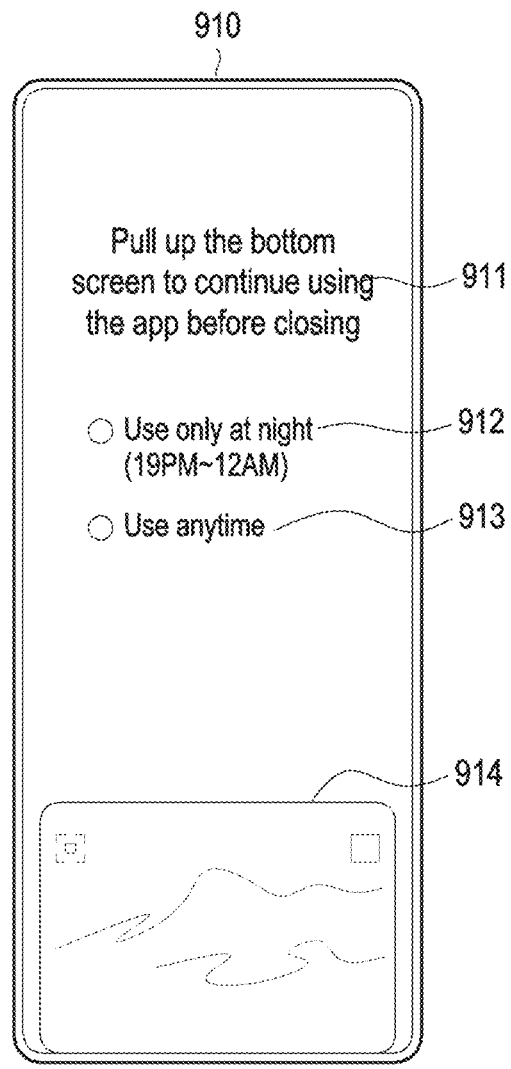
FIG. 9 illustrates a screen displayed on an electronic device according to an embodiment of the disclosure.

FIG. 9 illustrates an example in which the preset first time period is night time from 7:00 PM to midnight, and the state of the at least one housing transitions from the first state to the second state in the night time period according to an embodiment of the disclosure.

A first screen 910 may include an image 914 corresponding to an execution screen of an application and a text 911 guiding an input scheme corresponding to the image 914. The first screen 910 may include a selectable menu item 912 for setting the night time period and a selectable menu item 913 for setting the entire time period. If the user swipe the image 914 after selecting the menu item 912, when at least one housing transitions from the first state to the second state while the application corresponding to the image 914 in the night time period is executed, the execution screen of the application corresponding to the second display area may be displayed. If the user swipe the image 914 after selecting the menu item 913, when at least one housing transitions from the first state to the second state while the application corresponding to the image 914 in the entire time period is executed, the execution screen of the application corresponding to the second display area may be displayed.

In an embodiment, the at least one processor 120 of the electronic device 101 may identify whether the first condition is met based on whether the time when the at least one housing transitions from the first state to the second state is included in a preset second time period, and at least one of the at least one application is included in a fourth application group. The fourth application group may be determined based on the frequency of using, on the electronic device 101 and a plurality of external electronic devices, each application among the plurality of applications provided by the electronic device during the second time period. Ac In another embodiment, the at least one processor 120 of the electronic device 101 may identify the applications included in the fourth application group by communicating with the server 108 storing data about the electronic device 101 and a plurality of external electronic devices, through the communication module 190. In still another embodiment, the first screen of FIG. 9 may be likewise applied in this example.

In an embodiment, the at least one processor 120 of the electronic device 101 may identify whether the first condition is met based on the number of times in which at least one of the at least one application is executed when the electronic device is in a first position range when the at least one housing transitions from the first state to the second state.

Figure 10A:
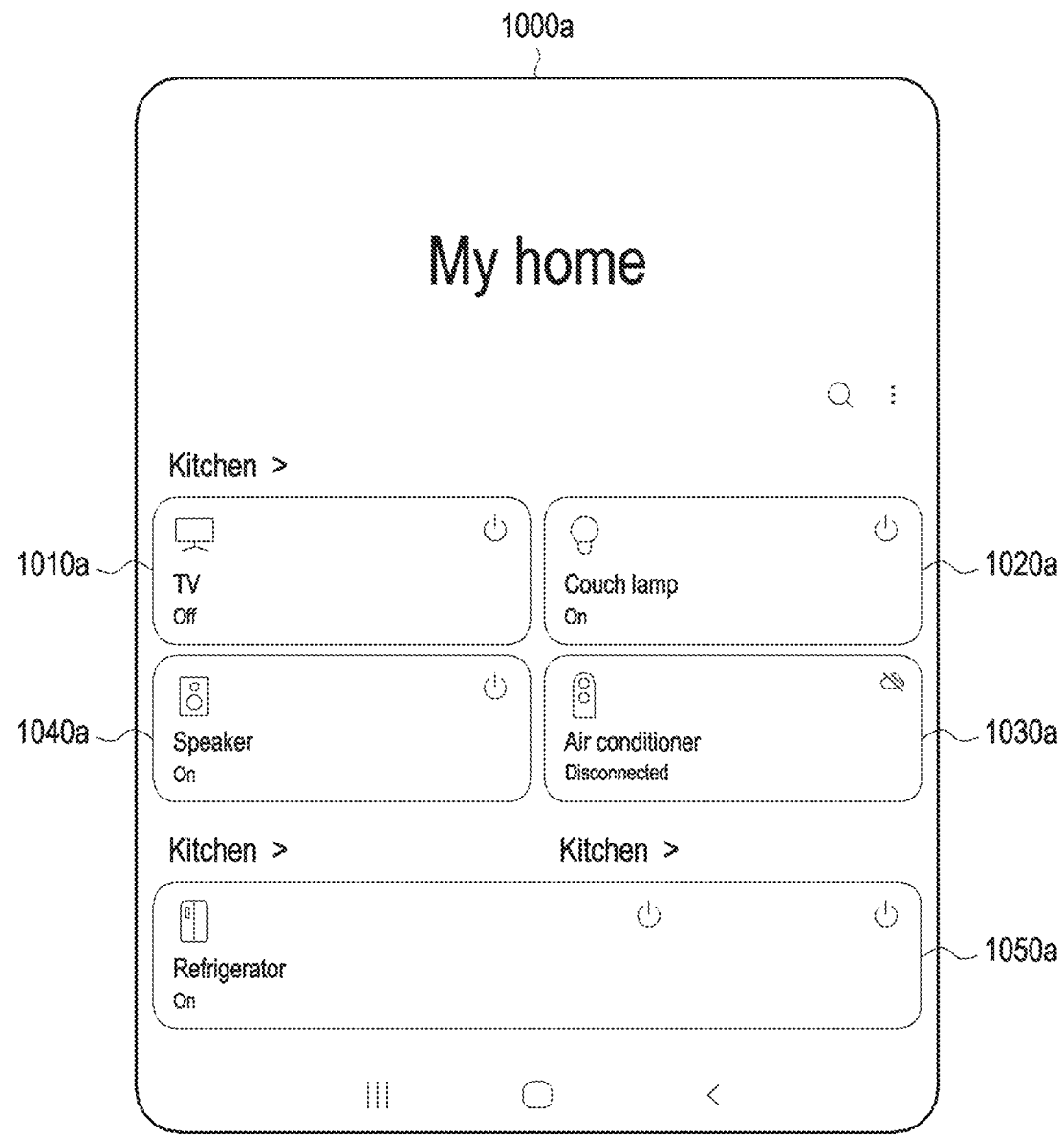
FIG. 10A illustrates a screen displayed on an electronic device according to an embodiment of the disclosure.

FIG. 10A illustrates an example execution screen of the application executed when the first is in the first position range according to an embodiment of the disclosure.

Referring to FIG. 10A, an execution screen 1000a may be an execution screen of an application for controlling IoT devices. In an embodiment, the execution screen 1000a may include a state of controllable IoT devices and items for controlling a state of each IoT device. The items may include an item 1010a for controlling a TV, an item 1020a for controlling a couch lamp, an item 1030a for controlling an air conditioner, an item 1040a for controlling a speaker, and an item 1050a for controlling a refrigerator. The application for controlling the IoT devices of FIG. 10A is highly likely to be executed in an area adjacent to where the IoT devices are positioned. In the example of FIG. 10A, the indoor area where the IoT devices are positioned, e.g., inside a house, may be the first position range.

Figure 10B:
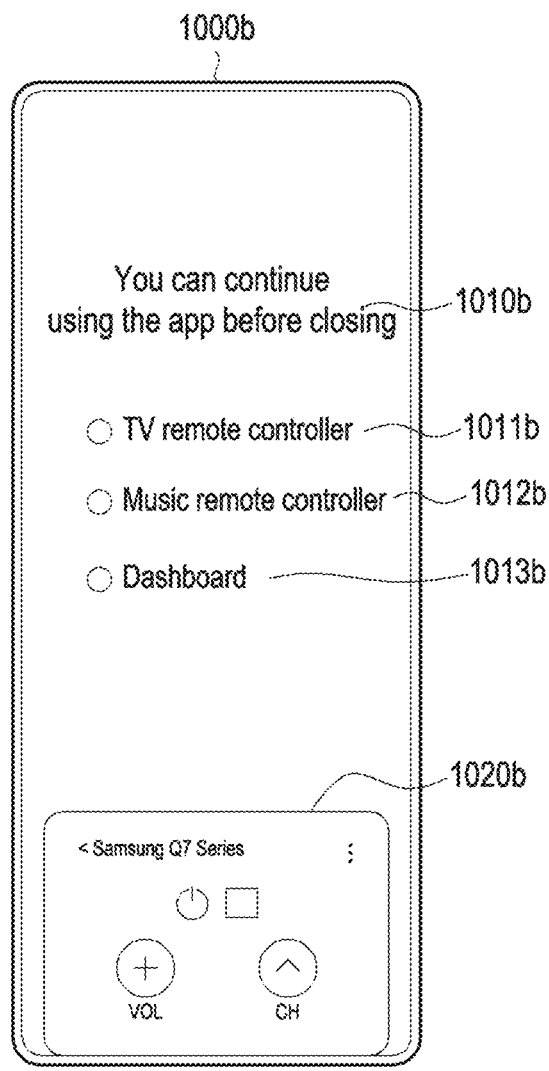
FIG. 10B illustrates a screen displayed on an electronic device according to an embodiment of the disclosure.

FIG. 10B illustrates an example of a first screen corresponding to the example of FIG. 10A according to an embodiment of the disclosure.

The first screen 1000b may include an image 1020b corresponding to an execution screen of an application and a text 1010b guiding an input scheme corresponding to the image 1020b. The first screen 1000b may include menu items 1011b, 1012b, and 1013b corresponding to IoT devices that may be controlled using the application. In a situation in which the user selects one of the menu items 1011b, 1012b, and 1013b or in a situation in which the user selects one of the menu items 1011b, 1012b, and 1013b and swipes the image 1020b, an interface for controlling the IoT device corresponding to the selected menu item may be displayed in the second display area.

In an embodiment, the at least one processor 120 of the electronic device 101 may identify whether the first condition is met based on whether the time when at least one of the at least one application is included in a fifth application group. The fifth application group may be determined based on the frequency of using, by a plurality of users belonging to the same group as the user of the electronic device, each application among the plurality of applications provided by the electronic device. In another embodiment, the server 108 communicating with the electronic device 101 and the plurality of external electronic devices may store information regarding the users' countries, ages, genders, and birth dates by the account information about the users of the electronic device 101 and the plurality of external electronic devices and information regarding the frequency of using the application by the electronic device 101 and the plurality of external electronic devices. The at least one processor 120 of the electronic device 101 may identify the applications included in the fifth application group by communicating with the server 108 through the communication module 190.

In operation 240, the at least one processor 120 of the electronic device 101 may identify a first input to a first graphic object corresponding to a first application among at least one graphic object. In an embodiment, the first application may mean the application corresponding to the graphic object specified by a first input among the at least one application corresponding to at least one graphic object. In another embodiment, the first input may be a combination of at least one of a single tap, a double tap, a long touch, or a drag input to the first graphic object. In still another embodiment, the first input may be an input corresponding to the text displayed on the first screen.

In operation 250, the at least one processor 120 of the electronic device 101 may display a second execution screen of the first application in at least a portion of the second display area in response to the first input. In an embodiment, the second execution screen may correspond to the second display area. In another embodiment, the size of the second execution screen may correspond to the size of the second display.

Figure 7C:
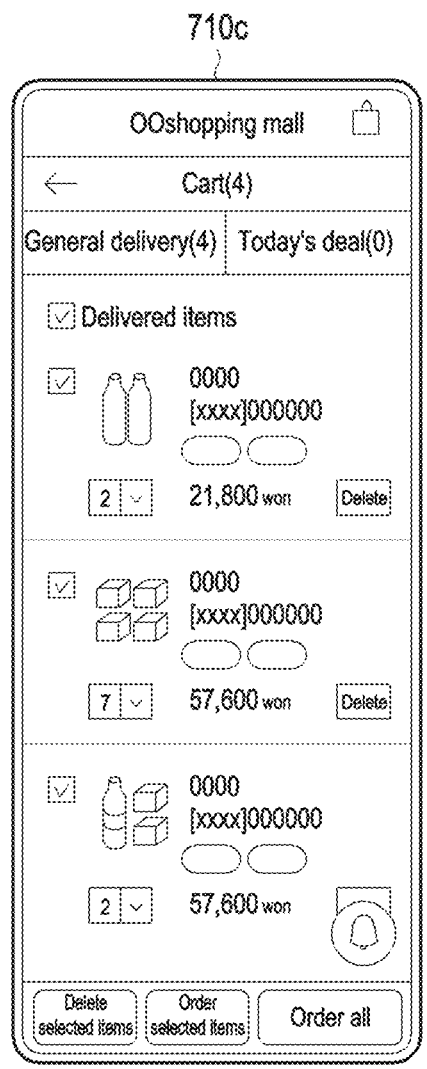
FIG. 7C illustrates a screen displayed on an electronic device according to an embodiment of the disclosure.

FIG. 7C illustrates an example of a screen displayed in the second display area displayed in response to a first input to a graphic object of the first screen in an example in which the first screen includes an execution screen of one application according to an embodiment of the disclosure.

An execution screen of a first application may be displayed on a screen 710c.

Figure 8C:
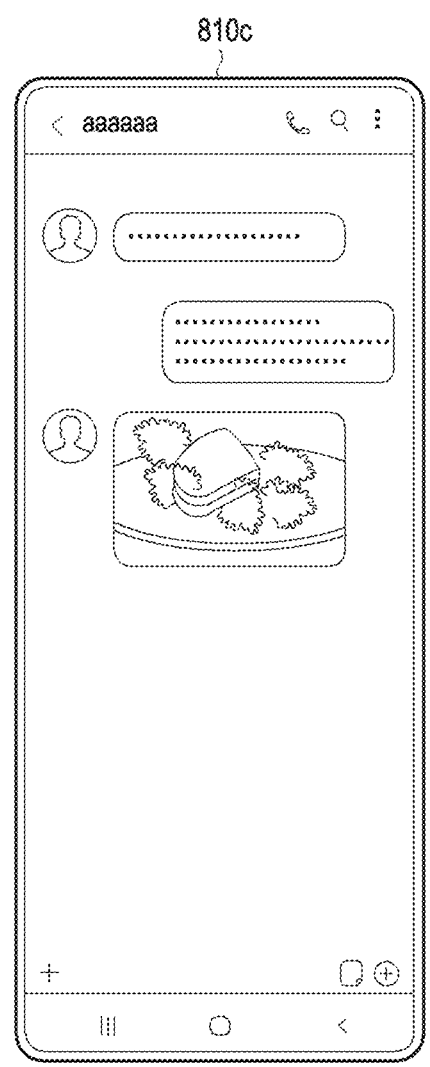
FIG. 8C illustrates a screen displayed on an electronic device according to an embodiment of the disclosure.

FIG. 8C illustrates an example of a screen displayed in the second display area displayed in response to a first input to one graphic object among the graphic objects of the first screen in an example in which the first screen includes execution screens of two applications according to an embodiment of the disclosure.

An execution screen of a first application selected by a first input of two applications displayed on a first execution screen may be displayed on a screen 810c.

In an embodiment, in operation 230, in a case where the first screen is displayed during a preset time, and the first input is not made until the preset time elapses, the at least one processor 120 of the electronic device 101 may display a black screen or an AOD screen in the second display area.

Further, although not shown in FIG. 2, according to other embodiments, unlike in operation 230, if the first condition is met, the at least one processor 120 of the electronic device 101 may display a screen displaying the color corresponding to the at least one application whose execution screen is displayed in the first state, on the second display area, based on a transition from the at least one housing from the first state to the second state. An example of the screen displaying the color corresponding to at least one application is illustrated in FIG. 11.

Figure 11:
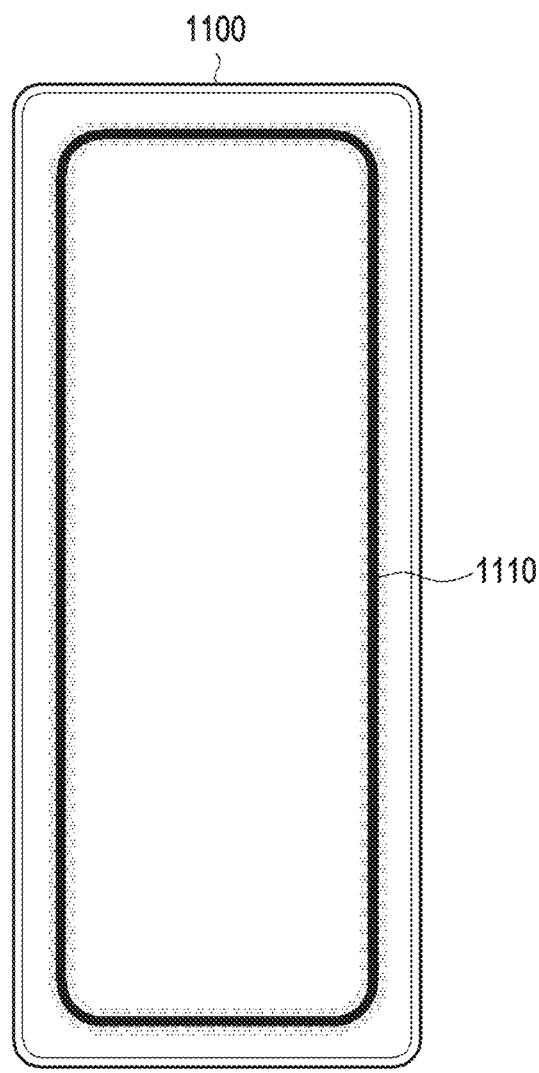
FIG. 11 illustrates a screen displayed on an electronic device according to an embodiment of the disclosure.

FIG. 11 illustrates a screen displayed on an electronic device according to an embodiment of the disclosure.

Referring to FIG. 11, a line 1110 in the color corresponding to at least one application may be displayed along an edge of the second display area 1100. In an embodiment, the color corresponding to the application may be included in metadata of the application. In another embodiment, the color corresponding to the application may be determined based on the icon image of the application. The color occupying the largest area in the icon image of the application may be identified as the color corresponding to the application. In a case where the screen displaying the color corresponding to the at least one application whose execution screen is displayed in the first state on the second display area, according to various embodiments, the at least one processor 120 of the electronic device 101 may display the first screen on the second display area in response to identifying a second input to the screen displaying the color corresponding to the at least one application. In still another embodiment, the second input may be defined as a combination of at least one of a single tap, a double tap, a long touch, or a drag input on the second display area.

FIG. 3A is a view illustrating an unfolded state of an electronic device according to an embodiment of the disclosure. FIG. 3B is a view illustrating a folded state of an electronic device according to an embodiment of the disclosure.

Referring to FIGS. 3A and 3B, according to an embodiment, an electronic device 300 may include a foldable housing 305, a hinge cover 330 covering a foldable portion of the foldable housing, and a flexible or foldable display 301 (hereinafter, simply "display 301") disposed in a space formed by the foldable housing 305. In the disclosure, a surface where the display 301 is disposed is defined as a first surface or a front surface of the electronic device 300. In an embodiment, the opposite surface of the front surface is defined as a second surface or a back surface of the electronic device 300. In another embodiment, the surface surrounding the space between the front and back surfaces is defined as a third surface or a side surface of the electronic device 300.

According to an embodiment, the foldable housing 305 may include a first housing structure 310, a second housing structure 320 including a sensor area 324, a first back (or rear) cover 380, and a second back (or rear) cover 390. In another embodiment, the foldable housing 305 of the electronic device 300 are not limited to the shape and coupling shown in FIGS. 3A and 3B but may rather be implemented in other shapes or via a combination and/or coupling of other components. In another embodiment, the first housing structure 310 and the first back cover 380 may be integrally formed with each other, and the second housing structure 320 and the second back cover 390 may be integrally formed with each other.

In the illustrated embodiment, a first housing structure 310 and a second housing structure 320 may be positioned on opposite sides of a folding axis (axis A), and they may be overall symmetrical in shape with each other with respect to the folding axis A. As set forth below, the first housing structure 310 and the second housing structure 320 may have different angles or distances formed therebetween depending on whether the electronic device 300 is in an unfolded, folded, or intermediate state. In the illustrated embodiment, the first housing structure 310 and the second housing structure 320 may be symmetrical in shape except that the second housing structure 520 further includes the sensor area 324 where various sensors are arranged, unlike the first housing structure 510.

According to an embodiment, as shown in FIG. 3A, a first housing structure 310 and a second housing structure 320 together may form a recess to receive the display 301. In the illustrated embodiment, due to the sensor area 324, the recess may have two or more different widths in the direction perpendicular to the folding axis A.

For example, the recess may have (1) a first width w1 between a first portion 310a parallel to the folding axis A of the first housing structure 310 and a first portion 320a formed at an edge of the sensor area 324 of the second housing structure 320 and (2) a second width w2 formed by a second portion 310b of the first housing structure 310 and a second portion 320b parallel to the folding axis A and not corresponding to the sensor area 324 of the second housing structure 320. The second width w2 may be longer than the first width w1. The first portion 310a of the first housing structure 310 and the first portion 320a of the second housing structure 320, asymmetric in shape with each other, may form the first width w1 of the recess, and the second portion 310b of the first housing structure 310 and the second portion 320b of the second housing structure 320, symmetric in shape with each other, may form the second width w2 of the recess. The first portion 320a and second portion 320b of the second housing structure 320 may differ in distance from the folding axis A. The width of the recess is not limited thereto. In an embodiment, the recess may have a plurality of widths due to the shape of the sensor area 324 or the asymmetric portions of the first housing structure 310 and the second housing structure 320.

In another embodiment, the first housing structure 310 and the second housing structure 320 may at least partially be formed of a metal or non-metallic material with a rigidity selected to support the display 301.

In still another embodiment, the sensor area 324 may be formed adjacent to a corner of the second housing structure 320 and to have a predetermined area. The placement, shape, or size of the sensor area 324 is not limited to those illustrated. In another embodiment, the sensor area 324 may be provided in a different corner of the second housing structure 320 or in any area between the top corner and the bottom corner. In an embodiment, components for performing various functions, embedded in the electronic device 300, may be exposed through the sensor area 324 or one or more openings in the sensor area 324 to the front surface of the electronic device 300. In another embodiment, the components may include various kinds of sensors. The sensor may include at least one of, e.g., a front-facing camera, a receiver, or a proximity sensor.

The first back cover 380 may be disposed on one side of the folding axis on the back surface of the electronic device and have a substantially rectangular periphery which may be surrounded by the first housing structure 310. Similarly, the second back cover 390 may be disposed on the opposite side of the folding axis on the back surface of the electronic device and its periphery may be surrounded by the second housing structure 320.

In the illustrated embodiment, the first back cover 380 and the second back cover 390 may be substantially symmetrical in shape with respect to the folding axis (axis A). However, the first rear cover 380 and the second rear cover 390 are not necessarily symmetrical in shape. In an embodiment, the electronic device 300 may include the first rear cover 380 and the second rear cover 390 in various shapes. In another embodiment, the first back cover 380 may be integrally formed with the first housing structure 310, and the second back cover 390 may be integrally formed with the second housing structure 320.

In still another embodiment, a combined structure of the first back cover 380, the second back cover 390, the first housing structure 310, and the second housing structure 320 may form a space where various components (e.g., a printed circuit board or battery) of the electronic device 300 may be disposed. In an embodiment, one or more components may be arranged or visually exposed on/through the back surface of the electronic device 300. At least a portion of a sub display 383 may be visually exposed through a first back surface area 382 of the first back cover 380. In still another embodiment, one or more components or sensors may be visually exposed through a second rear surface area 392 of the second rear cover 390. The sensor may, for example, include a proximity sensor and/or a rear-facing camera.

Referring to FIG. 3B, the hinge cover 330 may be disposed between the first housing structure 310 and the second housing structure 320 to hide the internal components (e.g., the hinge structure). In an embodiment, the hinge cover 330 may be hidden by a portion of the first housing structure 310 and second housing structure 320 or be exposed to the outside depending on the state (e.g., the unfolded state or folded state) of the electronic device 300.

As shown in FIG. 3A, in the unfolded state of the electronic device 300, the hinge cover 330 may be hidden, and thus not exposed, by the first housing structure 310 and the second housing structure 320. By way of example, as shown in FIG. 3B, in the folded state (e.g., the fully folded state) of the electronic device 300, the hinge cover 330 may be exposed to the outside between the first housing structure 310 and the second housing structure 320. As another example, in an intermediate state in which the first housing structure 310 and the second housing structure 320 are folded with a certain angle, the first hinge cover 330 may be partially exposed to the outside between the first housing structure 310 and the second housing structure 320. In this situation, however, the exposed area may be smaller than in the fully folded state. According to an embodiment, the hinge cover 330 may include a curved surface.

In an embodiment, the display 301 may be disposed on a space formed by the foldable housing 305. For example, the display 301 may be seated on a recess formed by the foldable housing 305 and may occupy most of the front surface of the electronic device 300.

In another embodiment, the front surface of the electronic device 300 may include the display 301 and a partial area of the first housing structure 310 and a partial area of the second housing structure 320, which are adjacent to the display 301. In still another embodiment, the rear surface of the electronic device 300 may include the first rear cover 380, a partial area of the first housing structure 310, which is adjacent to the first rear cover 380, the second rear cover 390, and a partial area of the second housing structure 320, which is adjacent to the second rear cover 390.

The display 301 may, for example, include a display in which at least a portion may be transformed to be flat or curved. In an embodiment, the display 301 may include a folding area 304, a first area 302 disposed on one side of the folding portion 304 (e.g., the left side of the folding portion 304 of FIG. 3A), and a second area 303 disposed on the opposite side of the folding portion 304 (e.g., the right side of the folding portion 103 of FIG. 3A).

The segmentation of the display 301 as shown in FIG. 3A is merely an example, and the display 301 may be divided into a plurality of (e.g., four or more, or two) areas depending on the structure or function of the display 401. In the embodiment illustrated in FIG. 3A, the area of the display 301 may be segmented by the folding area 304 or folding axis (axis A) extending in parallel with the y axis but, in another embodiment, the display 301 may also be segmented with respect to other folding area (e.g., a folding area parallel with the x axis) or other folding axis (e.g., a folding axis parallel with the x axis).

In an embodiment, the first area 302 and the second area 303 may be overall symmetrical in shape with respect to the folding area 304. However, unlike the first area 302, the second area 303 may include a notch depending on the presence of the sensor area 324, but the rest may be symmetrical in shape with the first area 302. In other words, the first area 302 and the second area 303 may include symmetrical portions and asymmetrical portions.

Described below are the operation of the first housing structure 310 and the second housing structure 320 and each area of the display 301 depending on the state (e.g., the unfolded state (flat state) and folded state) of the electronic device 300.

In an embodiment, when the electronic device 300 is in the unfolded state (flat state) (e.g., FIG. 3A), the first housing structure 310 and the second housing structure 320 may be angled at 180 degrees therebetween, facing in the same direction. The surface of the first area 302 and the surface of the second area 303 of the display 301 may be angled at 180 degrees therebetween while facing in the same direction (e.g., forward of the front surface of the electronic device). The folding area 304 may be coplanar with the first area 302 and the second area 303.

In another embodiment, when the electronic device 300 is in the folded state (e.g., FIG. 3B), the first housing structure 310 and the second housing structure 320 may be disposed to face each other. The surface of the first area 302 and the surface of the second area 303 of the display 301 may be angled at a small angle (e.g., ranging from 0 degrees to 10 degrees) therebetween while facing each other. At least a portion of the folding area 304 may have a curved surface with a predetermined curvature.

In still another embodiment, when the electronic device 300 is in the intermediate state, the first housing structure 310 and the second housing structure 320 may be disposed at a certain angle therebetween. In an embodiment, the surface of the first area 302 of the display 301 and the surface of the second area 303 may form an angle which is larger than the angle in the folded state and smaller than the angle in the unfolded state. In another embodiment, the folding area 304 may at least partially have a curved surface with a predetermined curvature and, in this case, the curvature may be smaller than that when it is in the folded state.

Figure 12:
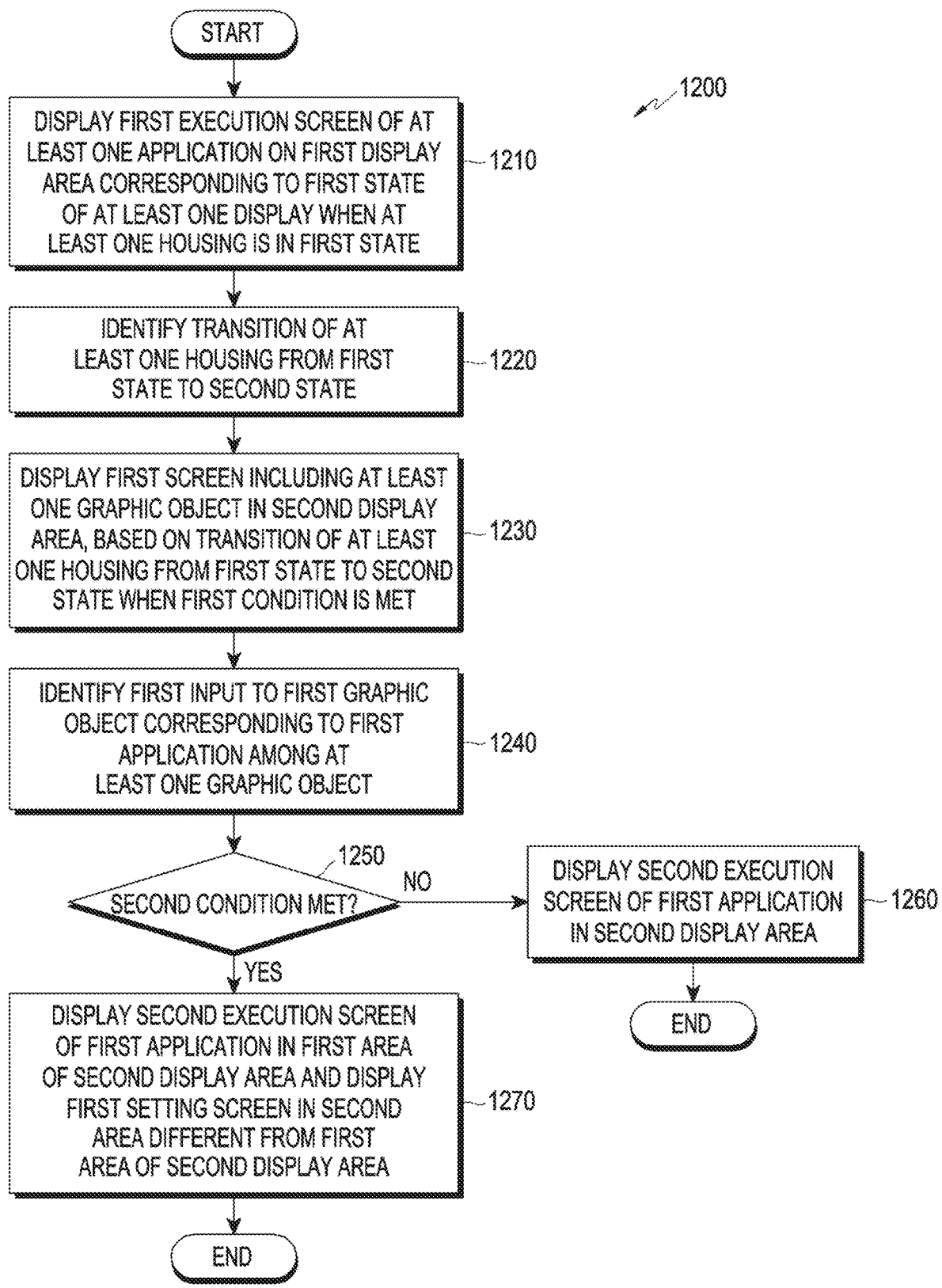
FIG. 12 is a flowchart illustrating operations of an electronic device according to an embodiment of the disclosure.

FIG. 12 is a flowchart 1200 illustrating operations of an electronic device according to an embodiment of the disclosure.

Referring to FIG. 12, in operation 1210, at least one processor (e.g., the processor 120) of an electronic device (e.g., the electronic device 101) may display a first execution screen of at least one application on a first display area corresponding to a first state of at least one display when at least one housing is in the first state. Details regarding operation 210 of FIG. 2 described above in connection with FIG. 2 may be equally applied to operation 1210.

In operation 1220, at least one processor 120 of the electronic device 101 may identify a transition from the first state to the second state. Details regarding operation 220 of FIG. 2 described above in connection with FIG. 2 may be equally applied to operation 1220.

In operation 1230, when the first condition is met, the at least one processor 120 of the electronic device 101 may display a first screen including at least one graphic object in the second display area based on the transition of the at least one housing from the first state to the second state. Details regarding operation 230 of FIG. 2 described above in connection with FIG. 2 may be equally applied to operation 1230.

In operation 1240, the at least one processor 120 of the electronic device 101 may identify a first input to a first graphic object corresponding to a first application among at least one graphic object. Details regarding operation 240 of FIG. 2 described above in connection with FIG. 2 may be equally applied to operation 1240.

In operation 1250, the at least one processor 120 of the electronic device 101 may identify whether a second condition is met. According to various embodiments, the second condition may be any combination of various conditions to be described below. According to various embodiments, the second condition may be defined by combining at least some of the various conditions to be described below, under an or condition or an and condition.

In an embodiment, the second condition may include when the first input is made a preset third number of times or more on the first screen. In another embodiment, the definitions of the first screen and the first input are the same as those described above with reference to FIG. 2. The at least one processor 120 of the electronic device 101 may identify whether operations 240 and 250 of FIG. 2 are performed the preset third number of times or more by referring to the memory (e.g., the memory 130).

In still another embodiment, the second condition may include when the first application supports the second execution screen corresponding to the second display area. In an embodiment, the first application may mean the application corresponding to the graphic object specified by a first input among the at least one application corresponding to at least one graphic object included in the first screen. In a situation in which the first application supports the resolution corresponding to the second display area, the first application may support the second execution screen.

In another embodiment, the second condition may include when the electronic device is set to display the execution screen of the second application in the second display area whenever the electronic device displaying the execution screen of the second application different from the first application on the first display area transitions from the first state to the second state. In another embodiment, the second condition may include when there is an application for which the electronic device 101 is set to display the execution screen in the second display area when at least one housing transitions from the first state to the second state in the settings menu of the electronic device 101, other than the first application specified by the first input.

In still another embodiment, the second condition may include when the first application is included in a sixth application group. The sixth application group may include a sixth number of applications most used in the second display area when the electronic device is in the second state during a preset fourth time. In an embodiment, the at least one processor 120 of the electronic device 101 may identify the sixth number of applications included in the sixth application group based on the data stored in the memory 130. In another embodiment, the at least one processor 120 of the electronic device 101 may identify the sixth number of applications included in the sixth application group by communicating with a server (e.g., the server 108) storing data about the electronic device 101 and a plurality of external electronic devices, through the communication module (e.g., the communication module 190).

When it is identified in operation 1250 that the second condition is not met, the at least one processor 120 of the electronic device 101 may display the second execution screen of the first application in the second display area in operation 1260. In an embodiment, the screens shown in FIGS. 7C and 8C may be examples of the second execution screen displayed in the second display area.

When it is identified in operation 1250 that the second condition is met, the at least one processor 120 of the electronic device 101 may display the second execution screen of the first application in a first area of the second display areas and display a first setting screen in a second area different from the first area of the second display area in operation 1270. Here, that the second area is different from the first area may include, in meaning, displaying the first setting screen overlaid on the second execution screen.

In another embodiment, an electronic device may be set to display a second execution screen of a first application in a second display area whenever at least one housing of the electronic device displaying an execution screen of the first application on a first display area transitions from a first state to a second state, on a first setting screen.

Figure 13:
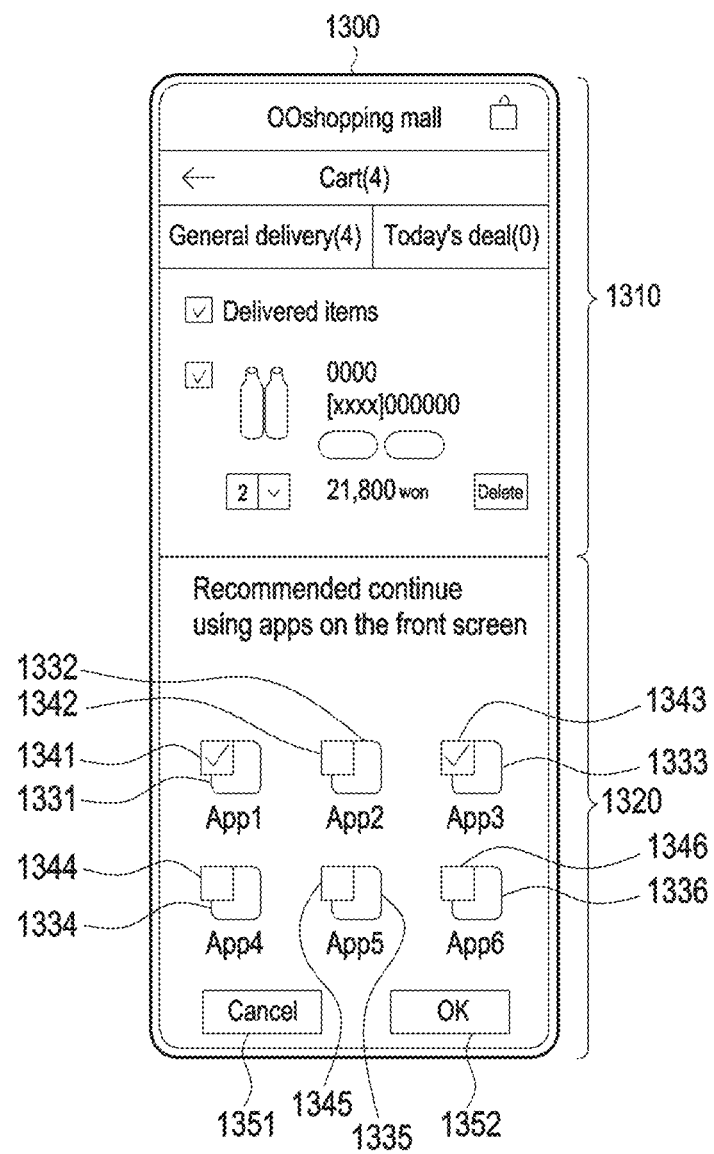
FIG. 13 illustrates a screen displayed on an electronic device according to an embodiment of the disclosure.

FIG. 13 illustrates an example screen displayed on an electronic device according to an embodiment of the disclosure.

An example of a second display area where a second execution screen is displayed, according to various embodiments, is described with reference to FIG. 13. A second execution screen 1310 and a first setting screen 1320 of the first application may be displayed in the second display area 1300 of FIG. 13. Graphic objects 1331, 1332, 1333, 1334, 1335, and 1336 corresponding to a plurality of candidate applications including the first application may be displayed on the first setting screen 1320. Further, graphic objects 1341, 1342, 1343, 1344, 1345, and 1346 for displaying selection for each of the plurality of candidate applications may be displayed on the first setting screen 1320. In a situation in which the user selects at least one among the graphic objects 1341, 1342, 1343, 1344, 1345, and 1346 and selects OK 1352, the execution screen of the application corresponding to the graphic object selected by the user is displayed in the first display area when the at least one housing is in the first state and, when the at least one housing transitions from the first state to the second state, the settings of the electronic device 101 may be changed so that the execution screen of the selected application is displayed in the second display area. In a situation in which the user selects cancel 1351, the settings of the electronic device 101 are not changed, and the first setting screen 1320 may not be displayed on the second display area any longer.

In an embodiment, the candidate application displayed in the first setting screen 1320 may be an application included in at least part of the application group to be described below.

In another embodiment, the candidate application may be an application included in a seventh application group. The seventh application group may include a seventh number of applications most used in the second display area in the second state.

In still another embodiment, the candidate application may be an application included in an eighth application group. The eighth application group may include an eighth number of applications where most external electronic devices among the plurality of external electronic devices are set to display the execution screen in the second display area when the at least one housing transitions from the first state to the second state. In an embodiment, the at least one processor 120 of the electronic device 101 may identify the eighth number of applications included in the eighth application group by communicating with the server 108 storing data about the electronic device 101 and a plurality of external electronic devices, through the communication module 190.

In another embodiment, the candidate application may be an application included in a ninth application group. The ninth application group may include a ninth number of applications that are most frequently used by a plurality of users belonging to the same group as the user of the electronic device. In still another embodiment, the at least one processor 120 of the electronic device 101 may identify a ninth number of applications included in the ninth application group by communicating, through the communication module 190, with the server 108 storing data regarding the accounts related to the electronic device 101 and a plurality of external electronic devices and application use history of the electronic device 101 and the plurality of external electronic devices.

In an embodiment, the candidate application may be an application included in a tenth application group. The tenth application group may include a sixth number of applications most used in the tenth display area when the electronic device is in the second state during a preset fifth time.

Figure 14:
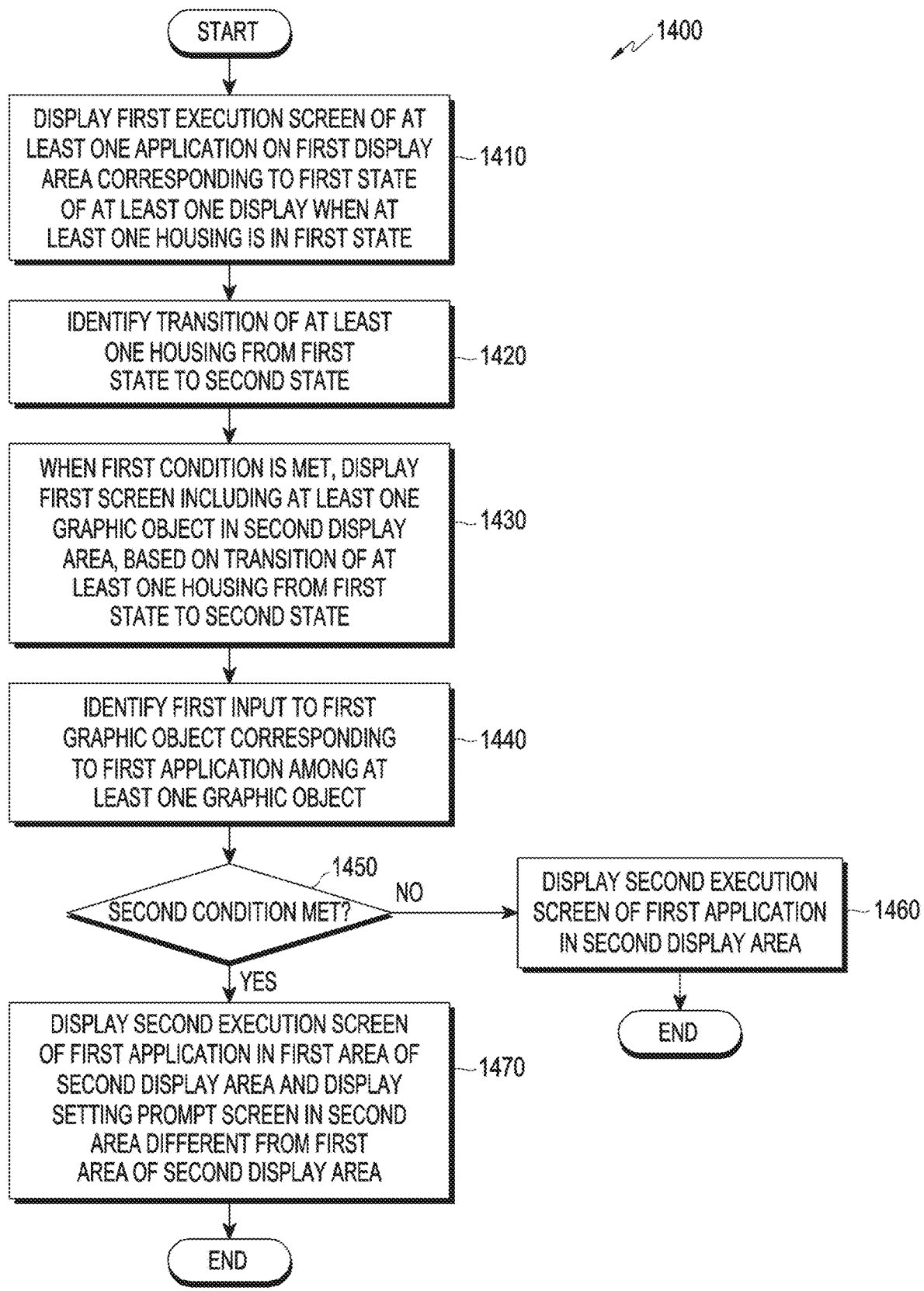
FIG. 14 is a flowchart illustrating operations of an electronic device according to an embodiment of the disclosure.

FIG. 14 is a flowchart 1400 illustrating operations of an electronic device according to an embodiment of the disclosure.

In operation 1410, at least one processor (e.g., the processor 120) of an electronic device (e.g., the electronic device 101) may display a first execution screen of at least one application on a first display area corresponding to a first state of at least one display when at least one housing is in the first state. Details regarding operation 210 of FIG. 2 described above in connection with FIG. 2 may be equally applied to operation 1410.

In operation 1420, at least one processor 120 of the electronic device 101 may identify a transition from the first state to the second state. Details regarding operation 220 of FIG. 2 described above in connection with FIG. 2 may be equally applied to operation 1420.

In operation 1430, when the first condition is met, the at least one processor 120 of the electronic device 101 may display a first screen including at least one graphic object in the second display area based on the transition of the at least one housing from the first state to the second state. Details regarding operation 230 of FIG. 2 described above in connection with FIG. 2 may be equally applied to operation 1430.

In operation 1440, the at least one processor 120 of the electronic device 101 may identify a first input to a first graphic object corresponding to a first application among at least one graphic object. Details regarding operation 240 of FIG. 2 described above in connection with FIG. 2 may be equally applied to operation 1440.

In operation 1450, the at least one processor 120 of the electronic device 101 may identify whether a second condition is met. Details regarding operation 1250 of FIG. 12 described above in connection with FIG. 2 may be equally applied to operation 1450.

When it is identified in operation 1450 that the second condition is not met, the at least one processor 120 of the electronic device 101 may display the second execution screen of the first application in the second display area in operation 1460. In an embodiment, the screens shown in FIGS. 7C and 8C may be examples of the second execution screen displayed in the second display area.

When it is identified in operation 1450 that the second condition is met, the at least one processor 120 of the electronic device 101 may display the second execution screen of the first application in a first area of the second display areas and display a setting prompt screen in a second area different from the first area of the second display area in operation 1470. Here, that the second area is different from the first area may include, in meaning, displaying the first setting screen overlaid on the second execution screen.

In another embodiment, the setting prompt screen may be, from among the settings menus of the settings application, a settings menu displaying a screen prompting whether to move to the second setting screen. The second setting screen may be a screen for setting, per application, whether to continue to display the execution screen of the application displayed on the pre-change on-display area, in the on-display area corresponding to the post-change state, when the state of at least one housing is changed.

Figure 15A:
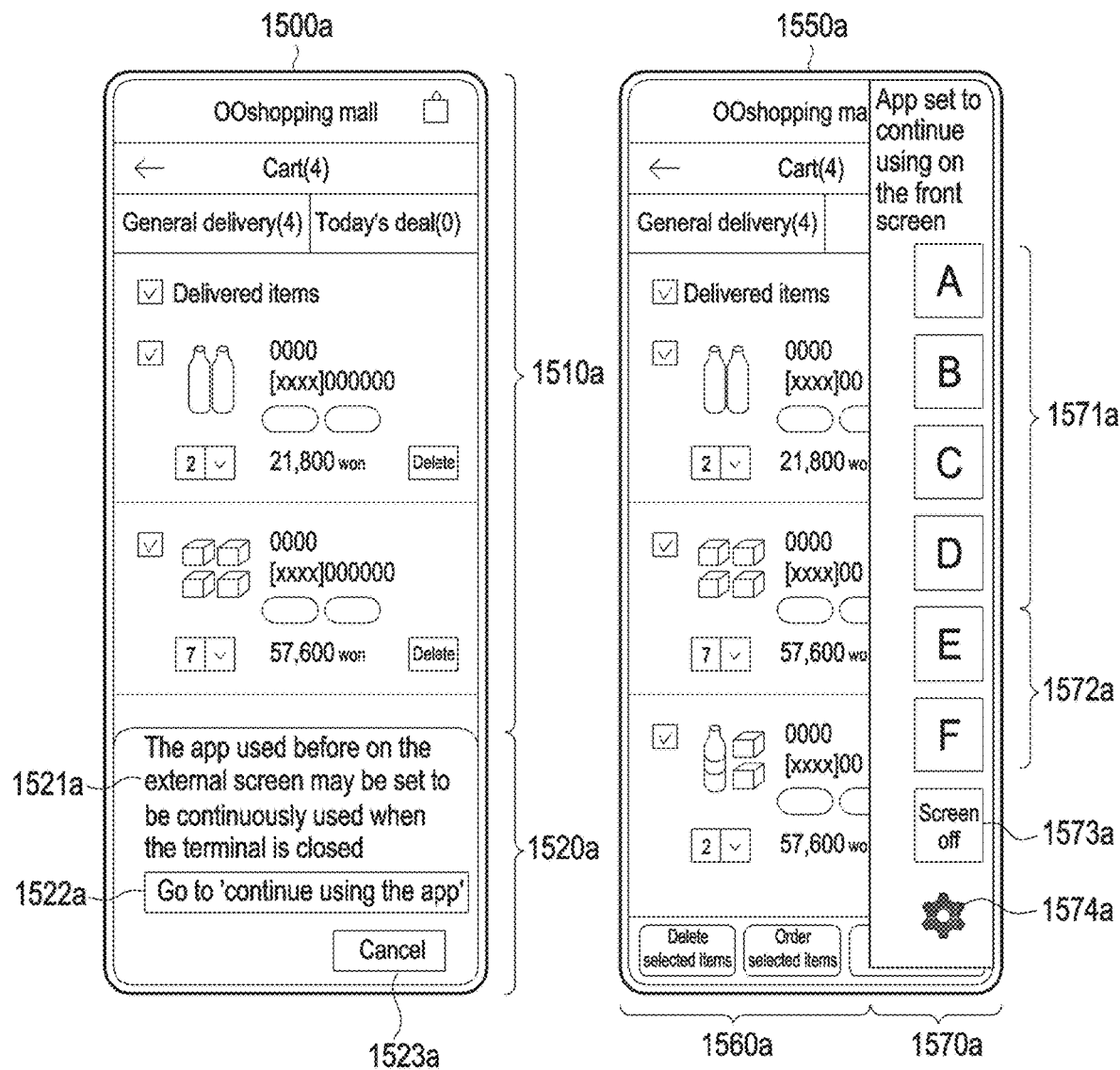
FIG. 15A illustrates screens displayed on an electronic device according to an embodiment of the disclosure.

FIG. 15A illustrates setting prompt screens displayed on an electronic device according to an embodiment of the disclosure.

In an embodiment, in operation 1470, the second display area 1500*a* may include a second execution screen 1510*a* and a setting prompt screen 1520*a* of the first application. Text 1521*a* indicating that it is possible to move to the second setting screen and options indicating move 1522*a* to the second setting screen and cancel 1523*a* may be displayed on the setting prompt screen 1520*a*. When the user selects cancel 1351, the display of the setting prompt screen 1520*a* may be stopped, and the second execution screen 1510*a* of the first application may be displayed in the entire second display area 1500*a*.

In another embodiment, in operation 1470, the second display area 1550*a* may include a second execution screen 1560*a* and a setting prompt screen 1570*a* of the first application. Options indicating move 1574*a* to the second setting screen and screen-off 1573*a* may be displayed on the setting prompt screen 1570*a*. In a situation in which the user displays screen-off 1573*a*, the at least one processor 120 of the electronic device 101 may display a black screen or an AOD screen on the second display area. A graphic object 1571*a* indicating applications already set to continue to display the execution screen of the application displayed in the pre-change on-display area, in the on-display area corresponding to the post-change state when the state of at least one housing is changed in the settings menu of the settings application may be displayed on the setting prompt screen 1570*a*. A graphic object 1572*a* indicating applications continuing to display the execution screen of the application displayed in the pre-change on-display area, in the on-display area corresponding to the post-change state when the state of at least one housing is recently changed may be displayed on the setting prompt screen 1570*a*.

Figure 15B:
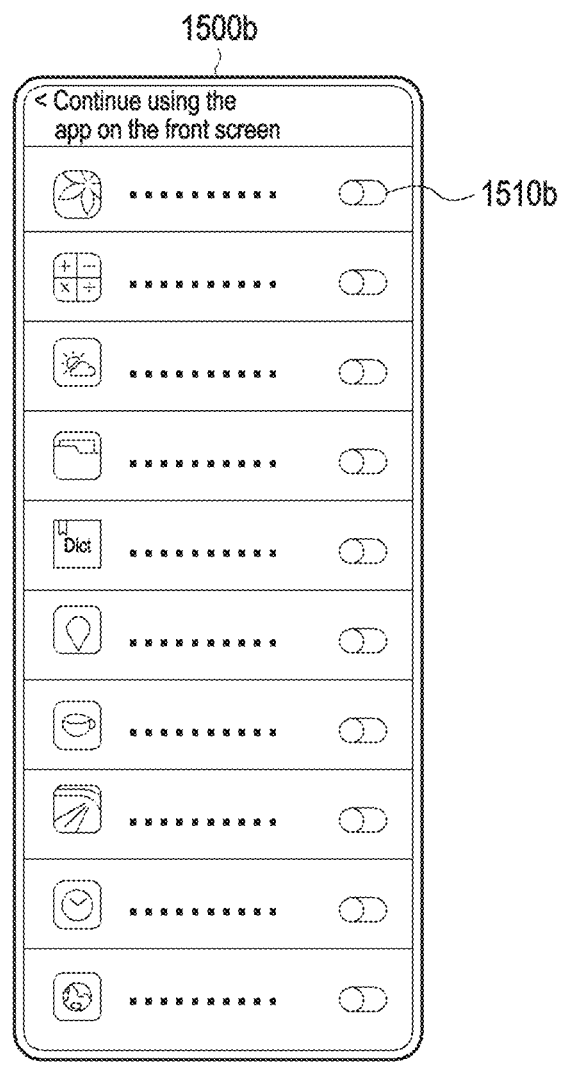
FIG. 15B illustrates a screen displayed on an electronic device according to an embodiment of the disclosure.

FIG. 15B illustrates a second setting screen displayed on an electronic device according to an embodiment of the disclosure.

A graphic object 1510*b* for setting whether to continue to display an execution screen of an application displayed in a pre-change on-display area, in the on-display area corresponding to a post-change state when the state of at least one housing is changed, for each application and a list of a plurality of applications may be displayed on a second setting screen 1500*b* of FIG. 15B.

Figure 16:
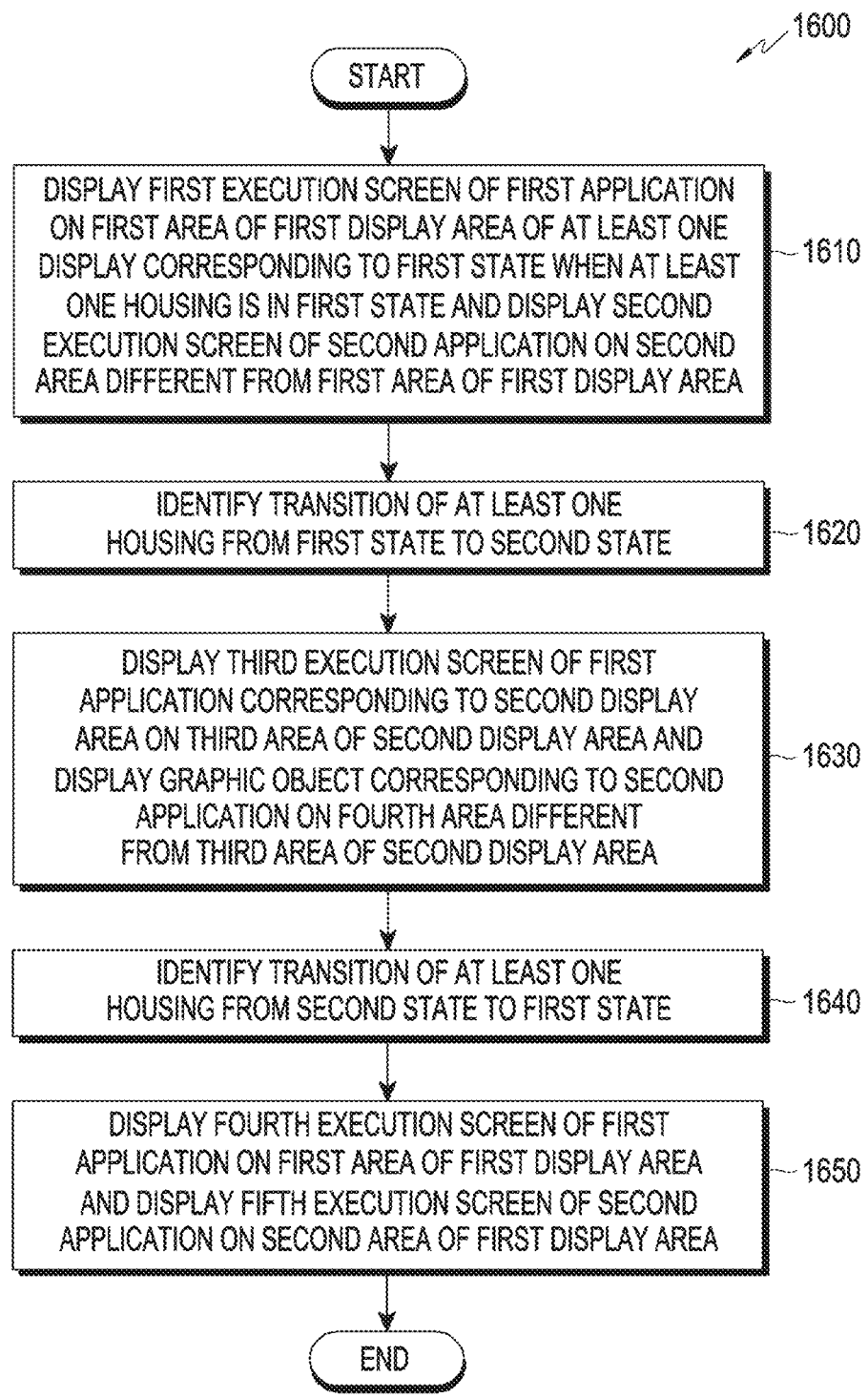
FIG. 16 is a flowchart illustrating operations of an electronic device according to an embodiment of the disclosure.

FIG. 16 is a flowchart 1600 illustrating operations of an electronic device according to an embodiment of the disclosure.

In operation 1610, the at least one processor (e.g., the processor 120) of the electronic device (e.g., the electronic device 101) may display a first execution screen of a first application on a first area of a first display area of at least one display corresponding to a first state and a second execution screen of a second application on a second area different from the first area of the first display area, when at least one housing of the electronic device 101 is in the first state. The first application supports the execution screen corresponding to the second display area, and the second application does not support the execution screen corresponding to the second display area.

According to various embodiments, the electronic device 101 may support dual-window or multi-window.

Figure 17A:
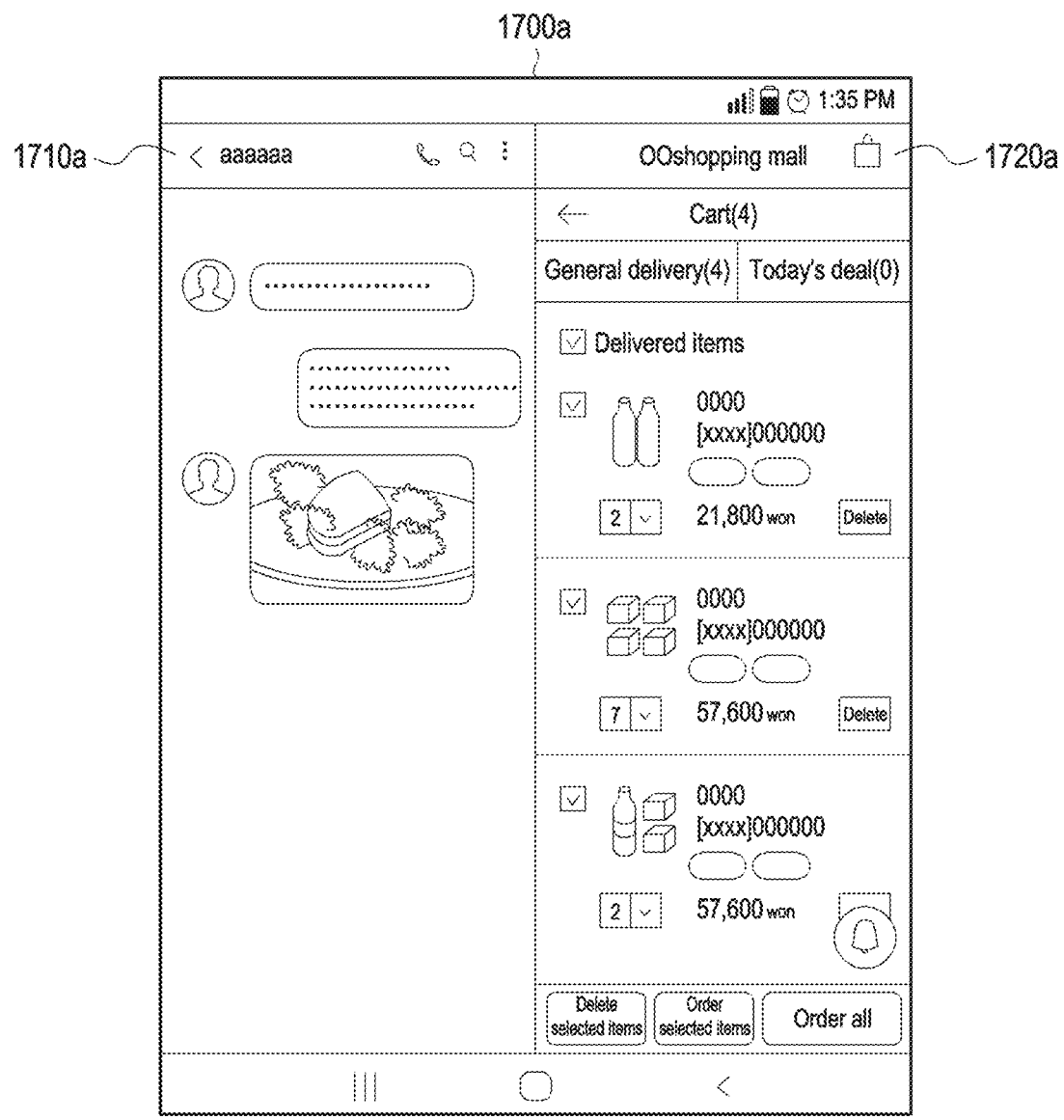
FIG. 17A illustrates a screen displayed on an electronic device according to an embodiment of the disclosure.

FIG. 17A illustrates an example of a screen displayed in the first display area in operation 1610 according to an embodiment of the disclosure.

Two windows exist in a first display area 1700*a* of FIG. 17A, a first execution screen 1710*a* of a first application is displayed in one window, and a second execution screen 1720*a* of a second application is displayed in the other window. In an embodiment, the area where the first execution screen 1710*a* of the first application is displayed in the first display area 1700*a* and the area in which the second execution screen 1720*a* of the second application is displayed may differ. In another embodiment, that the area in which the first execution screen 1710*a* of the first application is displayed differs from the area in which the second execution screen 1720*a* of the second application is displayed may include when the area in which the first execution screen 1710a of the first application is displayed overlaps a portion of the area in which the second execution screen 1720a of the second application is displayed.

In operation 1620, at least one processor 120 of the electronic device 101 may identify that at least one housing of the electronic device 101 transitions from the first state to the second state.

In operation 1630, the at least one processor 120 of the electronic device 101 may display a third execution screen of the first application corresponding to the second display area on the third area of the second display area and display the graphic object corresponding to the second application on the fourth area different from the third area of the second display area. An example of the screen displayed in the second display area is shown in FIG. 17B in operation 1630.

Figure 17B:
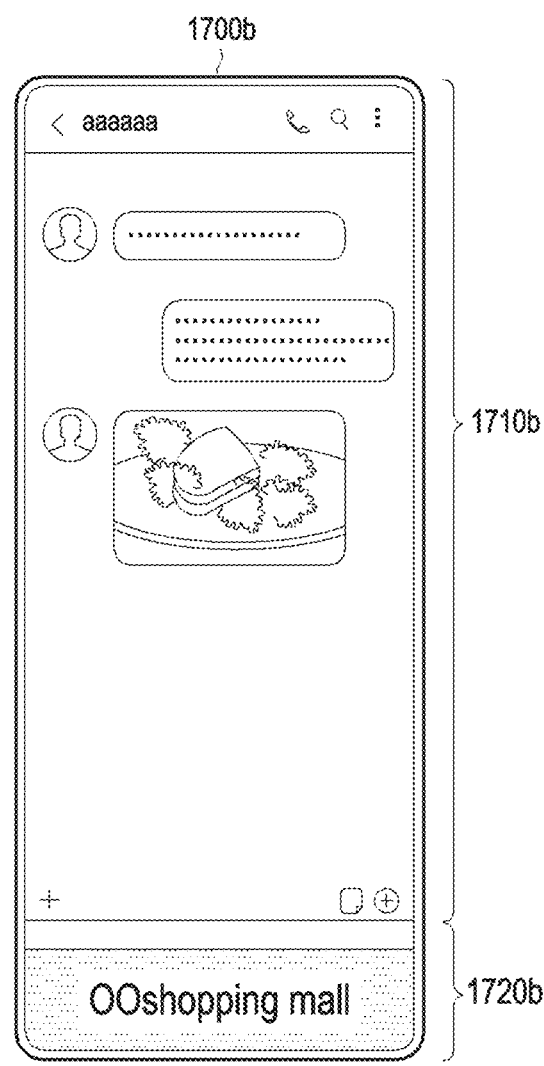
FIG. 17B illustrates a screen displayed on an electronic device according to an embodiment of the disclosure.

FIG. 17B illustrates a screen displayed on an electronic device according to an embodiment of the disclosure.

Referring to FIG. 17B, a third execution screen of a first application may be displayed in a third area 1710b of a second display area 1700b, and a graphic object corresponding to a second application, rather than an execution screen of a second application, may be displayed in a fourth area 1720b different from a third area 1710b.

In operation 1640, at least one processor 120 of the electronic device 101 may identify that at least one housing of the electronic device 101 transitions from the second state to the first state.

In operation 1650, the at least one processor 120 of the electronic device 101 may display the fourth execution screen of the first application on the first area of the first display area and display the fifth execution screen of the second application on the second area of the first display area. In operation 1650, the screen displayed on the first display area may be similar to that of FIG. 17A. The content on the fourth execution screen and fifth execution screen may differ from the first execution screen and second execution screen of operation 1610 by a user input made before/after the state transition identified in operation 1620 and the state transition identified in operation 1640.

In an embodiment, the user may be guided to the settings menu of the settings application when there is no history set to continue to display the execution screen of the application displayed in the pre-change on-display area, in the on-display area corresponding to the post-change state when the state of at least one housing is changed, for any application on the settings application of the electronic device. In this case, when the at least one housing of the electronic device transitions from the first state to the second state while the execution screen of the application is displayed in the first display area when the state of the at least one housing is changed on the settings application, the setting prompt screen may be displayed in the second display area. In another embodiment, the setting prompt screen 1520a of FIG. 15A may be displayed, and a black screen or any other screen, instead of the execution screen of the application, may be displayed on the portion corresponding to a first area of the second execution 1510a of FIG. 15A.

In still another embodiment, it may be assumed that there is an application (hereinafter, 'set application') set to continue to display the execution screen of the application displayed in the pre-change on-display area, in the on-display area corresponding to the post-change state when the state of at least one housing is changed, on the settings application of the electronic device. When the at least one housing of the electronic device transitions from the first state to the second state while displaying the execution screen of the set application in the first display area when the at least one housing of the electronic device is in the first state, a screen similar to the screen shown in FIG. 18 may be displayed in the second display area.

Figure 18:
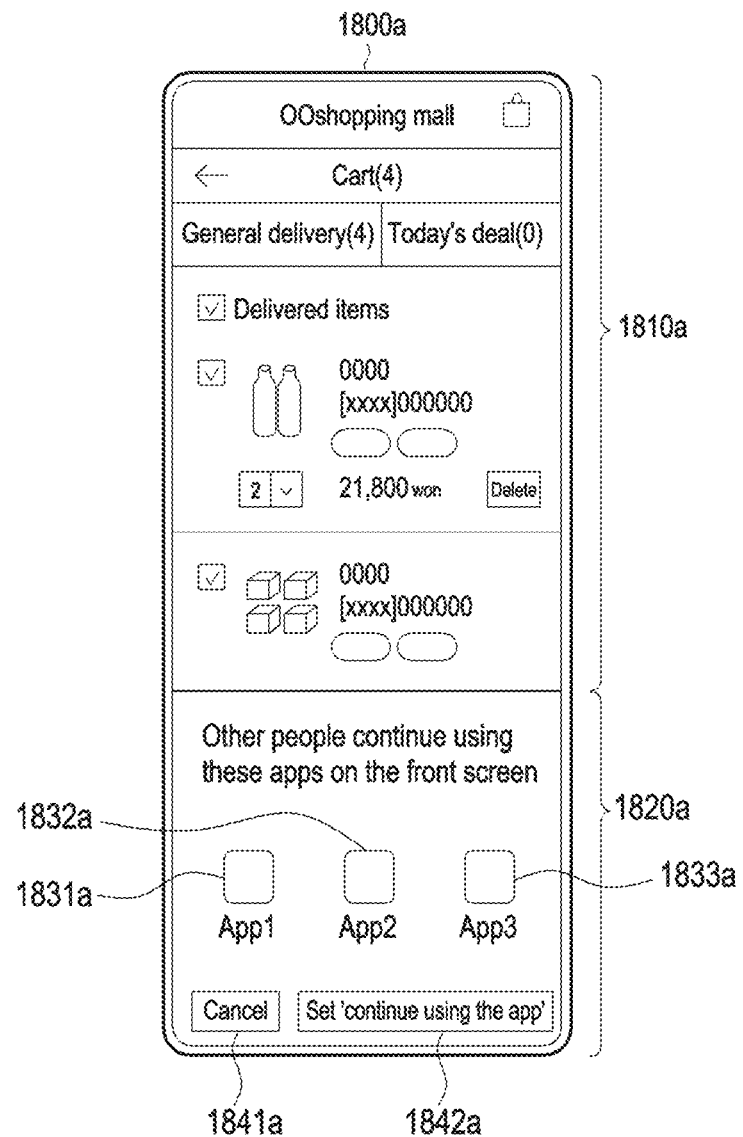
FIG. 18 illustrates a screen displayed on an electronic device according to an embodiment of the disclosure.

FIG. 18 illustrates a screen displayed on an electronic device according to an embodiment of the disclosure.

Referring to FIG. 18, an execution screen 1810a of a set application may be displayed in a partial area of a second display area 1800a, and a prompt 1820a for recommending an application that may additionally be set may be displayed in another partial area of the second display area 1800a. The prompt 1820a may include text 1821a indicating that a recommended application is presented and objects indicating at least one recommended application 1831a, 1832a, and 1833a, a move 1842a to the second setting screen, and a cancel 1841a. According to various embodiments, the at least one recommended application 1831a, 1832a, and 1833a may include an application most used by an unspecified number of people who are similar in age to the user of the electronic device 101. In an embodiment, the server 108 communicating with the electronic device 101 and the plurality of external electronic devices may store information about the users of the electronic device 101 and the plurality of external electronic devices and information regarding the history of using the application by the electronic device 101 and the plurality of external electronic devices. The at least one processor 120 of the electronic device 101 may identify applications most used by an unspecified number of people similar in age to the user by communicating with the server 108 through the communication module 190. In another embodiment, to identify at least one recommended application 1831a, 1832a, and 1833a, the above-described conditions for identifying the candidate application may be applied.

In still another embodiment, an electronic device 101 may comprise at least one housing capable of having a plurality of states, at least one display 160, and at least one processor 120. The at least one processor 120 may be configured to, when the at least one housing is in a first state, display a first execution screen of at least one application on a first display 160 area corresponding to the first state of the at least one display, the first execution screen corresponding to the first display 160 area, identify a transition of the at least one housing from the first state to a second state, the second state corresponding to a second display 160 area of the at least one display, when a first condition is met, display a first screen including at least one graphic object in the second display 160 area based on the transition of the at least one housing from the first state to the second state, the at least one graphic object respectively corresponding to the at least one application, and display a second execution screen of the first application in at least a portion of the second display 160 area in response to a first input to a first graphic object corresponding to a first application among the at least one graphic object, the second execution screen corresponding to the second display 160 area.

In another embodiment, the at least one processor 120 may be configured to identify whether the first condition is met based on at least one of: a number of times in which a wake-up input to the electronic device 101 is performed within a preset first time after the at least one housing transitions from the first state to the second state, a number of times in which an input included in a predefined first input group to the electronic device 101 is performed within a preset second time after the at least one housing transitions from the first state to the second state, whether at least one of the at least one application is included in a first application group, the first application group being determined based on a number of times in which each application of a plurality of applications provided by the electronic device 101 is used in the second display area, whether at least one of the at least one application is included in a second application group, the second application group being determined based on a number of external electronic devices 101 configured to display an execution screen in the second display area when the at least one housing transitions from the first state to the second state, among a plurality of external electronic devices 101, a time of using at least one of the at least one application while the at least one housing is in the first state, whether a time when the at least one housing transitions from the first state to the second state is included in a preset first time period, and at least one of the at least one application is included in a third application group, the third application group being determined based on a frequency of using each application of a plurality of applications provided by the electronic device 101, on the electronic device 101 during the first time period, whether the time when the at least one housing transitions from the first state to the second state is included in a second time period, and at least one of the at least one application is included in a fourth application group, the fourth application group being determined based on a frequency of using each application of the plurality of applications provided by the electronic device 101, on the electronic device 101 and the plurality of external electronic devices 101 during the second time period, a number of times in which at least one of the at least one application is executed when the electronic device 101 is in a first position range which a current position of the electronic device 101 is in, or whether at least one of the at least one application is included in a fifth application group, the fifth application group being determined based on a frequency of using each application of the plurality of applications provided by the electronic device 101, by a plurality of users belonging to the same group as a user of the electronic device 101.

In still another embodiment, the at least one processor 120 may be configured to display at least one color respectively corresponding to the at least one application in at least a portion of the second display 160 area before displaying the first screen in the second display 160 area in response to the transition of the at least one housing from the first state to the second state when the first condition is met and display the first screen in the second display 160 area in response to a second input made to the second display 160 area while the at least one color is displayed.

In an embodiment, the second input may be a combination of at least one of a single tap, a double tap, a long touch, or a drag input on the second display 160 area.

In another embodiment, the at least one graphic object may include at least one of at least one image respectively corresponding to an execution screen of the at least one application, at least one icon respectively corresponding to the at least one application, or a selectable menu item. In still another embodiment, the first input may be a combination of at least one of a single tap, a double tap, a long touch, or a drag input to the first graphic object.

In an embodiment, the at least one processor 120 may be configured to display the second execution screen of the first application in a first area of the second display 160 area in response to the first input when a second condition is met and display a first setting screen in a second area different from the first area of the second display 160 area, and wherein the electronic device 101 may be configured to display the second execution screen of the first application in the second display 160 area whenever the at least one housing of the electronic device 101 displaying the execution screen of the first application on the first display 160 area transitions from the first state to the second state, on the first setting screen.

In another embodiment, the at least one processor 120 may be configured to display a plurality of candidate applications including the first application, in the first setting screen, identify a selection for at least one second application among the plurality of candidate applications, and configure the electronic device 101 to display an execution screen of each of the at least one second application in the second display 160 area when the at least one housing of the electronic device 101 executing each of the at least one second application in the first state transitions to the second state, based on identifying the selection for the at least one second application.

In still another embodiment, the plurality of candidate applications may include applications included in at least one of a first application group including a first number of applications most used in the second display 160 area in the second state, a second application group including a second number of applications where there are most external electronic devices 101 configured to display the execution screen in the second display 160 area when the at least one housing transitions from the first state to the second state among a plurality of external electronic devices 101, a fifth application group including a fifth number of applications most frequency used by a plurality of users belonging to the same group as the user of the electronic device 101, or a sixth application group including a sixth number of applications most used in the second display 160 area when the electronic device 101 is in the second state during a preset fourth time.

In an embodiment, the at least one processor 120 may be configured to display the second execution screen of the first application in a first area of the second display 160 area in response to the first input when a second condition is met, display a setting prompt screen to prompt whether to move to a second setting screen in a second area different from the first area of the second display 160 area, identify a third input to instruct to move to the second setting screen on the setting prompt screen, and display the second setting screen in the second display 160 area in response to the third input. In another embodiment, the electronic device 101 may be configured to display the second execution screen of the first application in the second display 160 area whenever the electronic device 101 displaying the execution screen of the first application on the first display 160 area transitions from the first state to the second state, on the second setting screen.

In still another embodiment, the at least one processor 120 may be configured to display a plurality of candidate applications including the first application, in the second setting screen, display the first application to be visually different from a remaining application except for the first application among the plurality of candidate applications, as at least part of displaying the plurality of candidate applications including the first application, in the second setting screen, identify a selection for a second application among the plurality of candidate applications, the second application being identical to or different from the first application, and configure the electronic device 101 to display an execution screen of the second application in the second display 160 area when the electronic device 101 executing the second application in the first state transitions to the second state based on identifying the selection for the second application.

In an embodiment, the at least one processor 120 may be configured to display the first application to be visually different from a remaining application except for the first application among the plurality of candidate applications, as at least part of displaying the plurality of candidate applications including the first application, in the second setting screen.

In another embodiment, the at least one processor may be configured to identify whether the second condition is met based on at least one of: a number of times in which the first input to the first screen is performed, whether the first application supports the second execution screen corresponding to the second display area, whether the electronic device is configured to display the execution screen of the second application in the second display area whenever the electronic device displaying the execution screen of the second application different from the first application on the first display area transitions from the first state to the second state, or whether the first application is included in a sixth application group, the sixth application group being determined based on a number of times in which each application among the plurality of applications provided by the electronic device is used in the second display area when the electronic device is in the second state during a preset fourth time.

In an embodiment, an electronic device 101 may comprise at least one housing capable of having a plurality of states, at least one display 160 (e.g., a display, one display, a first display, a second display, a display device), and at least one processor 120. In another embodiment, the at least one processor 120 may be configured to, when the at least one housing is in a first state, display a first execution screen of a first application on a first area of a first display 160 area of the at least one display 160 corresponding to the first state and display a second execution screen of a second application on a second area different from the first area of the first display 160 area, identify a transition of the at least one housing from the first state to a second state, the second state corresponding to a second display 160 area of the at least one display 160, and the first application supporting an execution screen corresponding to the second display 160 area, and the second application not supporting an execution screen corresponding to the second display 160 area, display a first graphic object corresponding to the first application in the second display 160 area based on the transition of the at least one housing from the first state to the second state, display a third execution screen of the first application corresponding to the second display 160 area in at least a portion of the second display 160 area, based on an input to the first graphic object, and display a fourth execution screen of the first application on the first area of the first display 160 area and a fifth execution screen of the second application on the second area of the first display 160 area based on a transition of the at least one housing from the second state to the first state while the third execution screen and the graphic object are displayed in the second display 160 area.

In still another embodiment, the at least one processor may be configured to configure the third execution screen of the first application to correspond to a resolution or size of the second display area when the first display area and the second display area differ in resolution or size.

In an embodiment, the at least one processor may be configured to identify that the second application does not support an execution screen corresponding to the second display area and refrain from displaying a second graphic object corresponding to the second application in the second display area while displaying a first graphic object corresponding to the first application in the second display area in response to the transition of the at least one housing from the first state to the second state based on identifying that the second application does not support the execution screen corresponding to the second display area.

In another embodiment, the at least one processor may be configured to identify that the second application does not support an execution screen corresponding to the second display area and display an indicator corresponding to the second application in the second display area while displaying a third execution screen of the first application in at least a portion of the second display area based on identifying that the second application does not support the execution screen corresponding to the second display area.

In still another embodiments, a method performed by an electronic device 101 including at least one housing capable of having a plurality of states and at least one display 160 may comprise, when the at least one housing is in a first state, displaying a first execution screen of at least one application on a first display 160 area of the at least one display 160 corresponding to the first state, the first execution screen corresponding to the first display 160 area, identifying a transition of the at least one housing from the first state to a second state, the second state corresponding to a second display 160 area of the at least one display 160, when a first condition is met, displaying a first screen including at least one graphic object in the second display 160 area based on the transition of the at least one housing from the first state to the second state, the at least one graphic object respectively corresponding to the at least one application, and displaying a second execution screen of the first application in at least a portion of the second display 160 area in response to a first input to a first graphic object corresponding to a first application among the at least one graphic object, the second execution screen corresponding to the second display 160 area.

In an embodiment, displaying the second execution screen of the first application in at least the portion of the second display 160 area may include displaying the second execution screen of the first application in a first area of the second display 160 area in response to the first input when a second condition is met and displaying a first setting screen in a second area different from the first area of the second display 160 area. In another embodiment, the electronic device 101 may be configured to display the second execution screen of the first application in the second display 160 area whenever the at least one housing of the electronic device 101 displaying the execution screen of the first application on the first display 160 area transitions from the first state to the second state, on the first setting screen.

In another embodiment, displaying the first setting screen may further include displaying a plurality of candidate applications including the first application, in the second area. The method may, for example, further comprise identifying a selection for at least one second application among the plurality of candidate applications, and configuring the electronic device 101 to display an execution screen of each of the at least one second application in the second display 160 area when the at least one housing of the electronic device 101 executing each of the at least one second application in the first state transitions to the second state, based on identifying the selection for the at least one second application.

In still another embodiment, displaying the second execution screen of the first application in at least a portion of the second display 160 area may include displaying the second execution screen of the first application in a first area of the second display 160 area in response to the first input when a second condition is met and displaying a setting prompt screen to prompt whether to move to a second setting screen in a second area different from the first area of the second display 160 area. The method may further comprise identifying a third input to instruct to move to the second setting screen on the setting prompt screen and displaying the second setting screen in the second display 160 area in response to the third input. The electronic device 101 may, for example, be configured to display the second execution screen of the first application in the second display 160 area whenever the electronic device 101 displaying the execution screen of the first application on the first display 160 area transitions from the first state to the second state, on the second setting screen.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. When an (e.g., first) component is referred to as being "connected (functionally or communicatively)" or "connected" to another (e.g., second) component, the component may be connected to the other component directly or via another component (e.g., a third component).

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software or machine-readable instructions (e.g., the program 140) containing commands that are stored in a machine (e.g., computer)-readable storage medium (e.g., an internal memory 136) or an external memory 138. The machine may be a device that may invoke a command stored in a non-transitory storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

A method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:
    a housing, including a first housing part and a second housing part rotatably coupled to each other, configured to transition between a plurality of states including a first state and a second state;
    a first display disposed on a first side of the first housing part and a first side of the second housing part;
    a second display disposed on a second side of the first housing part;
    a processor; and
    memory storing instructions that, when executed by the processor, cause the portable communication device to:
        display, on the first display, a setting screen including a list of applications, wherein the setting screen is for setting, for each application on the list of applications, whether to continue to display an execution screen of the application when the state of the housing is transitioned from the first state to the second state,
        display a first execution screen of a first application on the list of applications via the first display while the housing is in the first state,
        based at least in part on the housing transitioning from the first state to the second state, determine whether the first application is set to continue to display an execution screen of the first application on the second display while the housing is in the second state,
        based at least in part on a determination that the first application is set to continue to display an execution screen of the first application while the housing is in the second state, display an indication indicative of the first application via the second display, and based at least in part on a first user input received with respect to the indication, display a second execution screen of the first application via the second display.

2. The portable communication device of claim 1, wherein the memory further includes instructions that, when executed by the processor, cause the portable communication device to:
   based at least in part on a determination that the first application is set not to continue to display an execution screen of the first application while the housing is in the second state, refrain from displaying the indication via the second display.

3. The portable communication device of claim 1, wherein the memory further includes instructions that, when executed by the processor, cause the portable communication device to:
   based at least in part on the first user input not being received within a specified period of time after the indication is displayed via the second display, display a black screen via the second display.

4. The portable communication device of claim 1,
   wherein the first housing part and the second housing part are fully unfolded with respect to each other while the housing is in the first state, and the first housing part and the second housing part are fully folded with respect to each other while the housing is in the second state.

5. The portable communication device of claim 1, wherein each of the first display and the second display forms a part of a flexible display accommodated in the housing, and the second display forms at least part of another display accommodated in one of the first housing part or the second housing part as facing opposite to the flexible display.

6. The portable communication device of claim 1, wherein the memory further includes instructions that, when executed by the processor, cause the portable communication device to, while the setting screen is displayed:
   receive a second user input with respect to the first application on the list of applications, the second user input setting the first application to continue to display an execution screen of the first application while the housing is in the second state.

7. The portable communication device of claim 6,
   wherein the memory further includes instructions that, when executed by the processor, cause the portable communication device to, while the setting screen is displayed:
   receive a third user input with respect to a second application on the list of applications, the third user input setting the second application not to continue to display an execution screen of the second application while the housing is in the second state, and
   based on the housing transitioning from the first state to the second state and on a determination that the second application is set not to continue to display an execution screen of the second application while the housing is in the second state, refrain from displaying the execution screen of the second application on the second display.

* * * * *